US011422520B2

(12) United States Patent
Telefus et al.

(10) Patent No.: US 11,422,520 B2
(45) Date of Patent: *Aug. 23, 2022

(54) BUILDING AUTOMATION SYSTEM

(71) Applicant: INTELESOL, LLC, Danville, CA (US)

(72) Inventors: Mark Telefus, Orinda, CA (US); Bradley Larson, Sunnyvale, CA (US); Harry Rodriguez, Gilroy, CA (US); Christopher Casey, San Francisco, CA (US); Thar Casey, Danville, CA (US); Steve Gerber, Austin, TX (US)

(*) Notice: Subject to any disclaimer, the term of this patent is extended or adjusted under 35 U.S.C. 154(b) by 98 days.

This patent is subject to a terminal disclaimer.

(21) Appl. No.: 17/145,291

(22) Filed: Jan. 9, 2021

(65) Prior Publication Data

US 2021/0173364 A1 Jun. 10, 2021

Related U.S. Application Data

(63) Continuation of application No. 16/340,303, filed on Apr. 8, 2019, now Pat. No. 10,931,473.

(51) Int. Cl.
*G05B 15/02* (2006.01)
*H02J 3/02* (2006.01)
*H02J 3/00* (2006.01)

(52) U.S. Cl.
CPC .............. *G05B 15/02* (2013.01); *H02J 3/003* (2020.01); *H02J 3/02* (2013.01)

(58) Field of Classification Search
CPC .......................... G05B 15/02; H02J 13/00001; H02J 13/0005; H02J 2310/12; H02J 3/003; H02J 3/02; Y02B 90/20; Y04S 20/00

See application file for complete search history.

(56) References Cited

U.S. PATENT DOCUMENTS

| | | |
|---|---|---|
| 4,074,345 A | 2/1978 | Ackermann |
| 4,127,895 A | 11/1978 | Krueger |
| 4,466,071 A | 8/1984 | Russell, Jr. |
| 4,581,540 A | 4/1986 | Guajardo |
| 4,631,625 A | 12/1986 | Alexander et al. |
| 4,760,293 A | 7/1988 | Hebenstreit |

(Continued)

OTHER PUBLICATIONS

Carvou, E. et al, Electrical Arc Characterization For Ac-Arc Fault Applications, 2009 Proceedings of the 55th IEEE Holm Conference on Electrical Contacts, IEEE Explore Oct. 9, 2009.

(Continued)

*Primary Examiner* — Kidest Bahta
(74) *Attorney, Agent, or Firm* — Mark Wisnosky

(57) ABSTRACT

A building automation system that is comprised of a plurality of network connected electrical modules contained in standard receptacle gang boxes for outlets and switches is described. The system includes an AC to DC power supply, a bidirectional solid state dimmer switch, a microprocessor, and, interconnected sensors that are powered and controlled by microprocessors within the electrical modules. The electrical modules include a user interface for programming and control. The system provides enhanced safety and security, power metering, power control, and home diagnostics. The apparatus replaces existing outlet receptacles and switches with a familiar flush but elegantly updated and seamlessly integrated faceplate.

22 Claims, 25 Drawing Sheets

(56) References Cited

U.S. PATENT DOCUMENTS

| | | | |
|---|---|---|---|
| 4,812,995 | A | 3/1989 | Girgis et al. |
| 5,121,282 | A | 6/1992 | White |
| 5,371,646 | A | 12/1994 | Biegelmeier |
| 5,654,880 | A | 8/1997 | Brkovic et al. |
| 5,796,274 | A | 8/1998 | Willis et al. |
| 5,933,305 | A | 8/1999 | Schmaltz et al. |
| 6,111,494 | A | 8/2000 | Fischer |
| 6,141,197 | A | 10/2000 | Xu |
| 6,169,391 | B1 | 1/2001 | Lei |
| 6,188,203 | B1 | 2/2001 | Rice et al. |
| 6,538,906 | B1 | 3/2003 | Ke et al. |
| 6,839,208 | B2 | 1/2005 | Macbeth et al. |
| 6,984,988 | B2 | 1/2006 | Yamamoto |
| 7,110,225 | B1 | 9/2006 | Hick |
| 7,319,574 | B2 | 1/2008 | Engel |
| 7,586,285 | B2 | 9/2009 | Gunji |
| 7,729,147 | B1 | 6/2010 | Wong et al. |
| 7,746,677 | B2 | 6/2010 | Unkrich |
| 7,948,719 | B2 | 5/2011 | Xu |
| 8,463,453 | B2 | 6/2013 | Parsons, Jr. |
| 8,717,720 | B2 | 5/2014 | Deboer |
| 8,817,441 | B2 | 8/2014 | Callanan |
| 8,947,838 | B2 | 2/2015 | Yamai et al. |
| 9,287,792 | B2 | 3/2016 | Telefus et al. |
| 9,577,420 | B2 | 2/2017 | Ostrovsky et al. |
| 9,621,053 | B1 | 4/2017 | Telefus |
| 2004/0032756 | A1 | 2/2004 | Van Den Bossche |
| 2008/0180866 | A1 | 7/2008 | Wong |
| 2008/0204950 | A1 | 8/2008 | Zhou et al. |
| 2008/0246451 | A1* | 10/2008 | Dobbins ............ H02M 5/2573 323/242 |
| 2009/0168273 | A1 | 7/2009 | Yu et al. |
| 2009/0213629 | A1 | 8/2009 | Liu et al. |
| 2010/0091418 | A1 | 4/2010 | Xu |
| 2010/0155369 | A1 | 6/2010 | Kularatna et al. |
| 2010/0320840 | A1 | 12/2010 | Fridberg |
| 2011/0156610 | A1 | 6/2011 | Ostrovsky et al. |
| 2011/0292703 | A1 | 12/2011 | Cuk |
| 2012/0026632 | A1 | 2/2012 | Acharya et al. |
| 2012/0089266 | A1 | 4/2012 | Tomimbang et al. |
| 2013/0261821 | A1* | 10/2013 | Lu ....................... H04L 12/2807 700/289 |
| 2014/0085940 | A1 | 3/2014 | Lee et al. |
| 2017/0265287 | A1* | 9/2017 | Avrahamy ........... H05B 39/086 |

OTHER PUBLICATIONS

Yang et al, Series Arc Fault Detection Algorithm Based on Autoregressive Bispectrum Analysis, Algorithms 2015, 8, 929-950; doi:10.3390/a8040929.

Restrepo, Arc Fault Detection and Discrimination Methods, Electrical Contacts—2007 Proceedings of the 53rd IEEE Holm Conference on Electrical Contacts, IEEE Explore Sep. 24, 2007.

Eguchi et al, Design of a Charge-Pump Type AC—DC Converter for RF-ID Tags, 2006 International Symposium on Communications and Information Technologies, F4D—3, IEEE (2006).

Park, Jeong-Eon, et al, Design on Topologies for High Efficiency Two-Stage AC-DC Converter, 2012 IEEE 7th International Power Electronics and Motion Control Conference—ECCE Asia Jun. 2-5, 2012, Harbin, China, p. 257.

Cuk, Slobodan, 98% Efficient Single-Stage AC/DC Converter Topologies, Power Electronics Europe, Issue 4, 2011, www.power-mag.com; p. 16.

* cited by examiner

BUILDING AUTOMATION SYSTEM

CROSS-REFERENCE TO RELATED APPLICATIONS

This application is a continuation of U.S. application Ser. No. 16/340303 titled Building Automation System, filed 11 Nov. 2019, which is a national stage entry of PCT/US2017/057309, filed 19 Oct. 2017, which claims priority to U.S. Provisional applications: 62/431,926 filed 9 Dec. 2016, and, 62/414,467 filed 28 Oct. 2016, and, 62/410,531 filed 20 Oct. 2016 all including a common inventor.

STATEMENT REGARDING FEDERALLY SPONSORED RESEARCH OR DEVELOPMENT

Not Applicable.

BACKGROUND OF THE INVENTION

Technical Field

The invention generally relates to the fields of power management and building automation.

Background of the Invention

The National Electrical Code (NEC), first published in the year 1897 and updated every three years, is the United States standard for safe installation of electrical wiring and equipment. NEC requirements have been added or updated over the years based upon safety considerations. In 1971, Ground-Fault Circuit Interrupters (GFCI) were added. In 1999, Arc-Fault Circuit Interrupters (AFCI) were added. In 2014, tamper-resistant (TR) electrical receptacles were added. In each case as requirements are added or updated they must be met in new or renovated dwellings.

The most common receptacle in the home is rated for 15 amps. NEC code allows a 15 amp receptacle on a 20 amp circuit as long as it's not the only receptacle on the circuit. This can result in a safety risk when the unknowing homeowner uses a power strip connected to high current devices such as entertainment systems. The total load could exceed the receptacle rating yet not trip the panel circuit breaker.

Factory and office automation is becoming ubiquitous. In factories use of multiple wired or wirelessly interconnected sensors to monitor and control manufacturing processes is now necessary for a competitive manufacturing site. Office automation where all computers and computing devices, such as smart phones and tablets are now expected to interconnect for collaboration amongst workers and to share resources such as printers, copiers, etc.

In many cases of both home, and, factory or office automation new sensors and computer controlled devices requires extension or installation of new networks. In some cases, this means difficult and expensive routing of network cables. Wireless networks can in some cases be used instead but often the building structure blocks or interferes with wireless communication throughout the building. Overcoming this requires a plurality of network repeater or signal boosters. Overcoming these wireless drawbacks results in a functional and aesthetical marginal system. In many cases the buildings, factories, offices or homes are pre-existing structures where running wire and locating wireless repeaters results in a compromised network. There is a need for a system that can easily be fit into the existing infrastructure of factories, offices and homes.

Devices and methods are needed to reduce the incidents of injury, death and property destruction. A safe, scalable, secure and easy to use networked system of outlet receptacles, switch receptacles and sensors is disclosed to achieve this goal.

Various objects, features, aspects, and advantages of the present invention will become more apparent from the following detailed description of preferred embodiments of the invention, along with the accompanying drawings in which like numerals represent like components.

Ideally building networking and control system could be fit into the common, currently existing and industry standard switch and outlet boxes. Impediments to retrofitting buildings are that the current switch boxes and outlet boxes cannot accommodate the electronics required for the networking. Typical networking and control systems require conversion to 3-5 DC volts. The supplies coming to the outlets and switches are 110 or 220 volts. The conversion from 100 or 220 volts AC to 3-5 volts DC generates considerable heat. This heat can constitute a fire hazard as well as harm to operation of any other electronics incorporated into the box. The NEC requires 2 cubic inches of free space for each 12-gauge conductor wire used within a conductor box. This means that any enclosed electronics should not generate heat on its own and further must not take up any space beyond the size of current switches and outlets. There is a need for an AC to DC converter and Switches that are small and efficient so as to not cause overheating within the enclosed switch and outlet boxes.

More and more appliances and devices now further includes sensors and networking capabilities. Communication protocols and Standards for the The Next Generation Internet of Things (NGIoT) are being written such that all such devices can provide status and can be controlled using common protocols. There is a need for a network system that can be used for both new construction and existing buildings to upgrade to these capabilities.

BRIEF SUMMARY OF THE INVENTION

The invention includes electrical interfaces that are included, in a preferred embodiment, in standard electrical outlet and switch boxes to power lights and devices plugged into outlets and to form a core system for home automation and control. In one embodiment, user interface designs, and, methods and protocols of use to fit or retrofit a building for automation and control are included with the electronics in the electrical boxes. One embodiment includes a faceplate design that is sized and shaped to fit and replace standard electrical switch and switch plates. The switch replacement faceplate and attached electronics include a user interface and electronics. In one embodiment the user interface is a touchscreen display that may be programmed to act as a sensor output display, a switch, and a slider dimmer switch. In some embodiments the faceplate includes a microphone and speaker and may be voice activated or activated by a motion detector. In another embodiment the electronics are incorporated into the electrical supply circuitry of the building and the user interface is through a separate computing device such as a programmable wireless telephone, tablet, personal computer or a separate device devoted exclusively to the building automation process.

In the preferred embodiment the electronics include:
an AC to DC converter,
a bidirectional switch with phase-control mode,
a load identifying sensor,
a ground and arc fault sensor, a computing device including a user interface and Input-Output interface all incorporated in a standard size (such as described in National Electronic Manufactures Association, NEMA documents OS-2), single gang, electrical outlet or switch box. In the preferred embodiment the AC to DC converter, the switch, the fault detector and the computing device separate from the I/O and display are incorporated on a single silicon chip.

In another embodiment additional sensors include voltage and current sensors to monitor electrical power through each device circuit as well as temperature, humidity, motion and sound sensors. One embodiment includes an electronic communication module such that a plurality of the electrical boxes may be wirelessly linked together thereby forming a mesh network that enables data from one of the electrical boxes to be available to all locations on the mesh network.

In another embodiment, a computing device is programmed to display analog or digital data received from the sensors and can activate alarms if the sensor readings are outside of pre-selected limits. The alarms include a visual display on the user interface of the faceplate, an audible sound from the audio output device, a communication signal sent through the electronic communication module and the signal sent to a light or audio alarm. In one embodiment the communication module can be programmed to accept commands and data from an external electronic device. The external device may be a programmable cellular telephone, a personal computer or a tablet computer. Communication between outlet and switch boxes may be through radio frequency communication such as Bluetooth® (Bluetooth is a registered trademark of BLUETOOTH SIG, INC.) type devices and protocols, nearfield communication and wi-fi devices, Zigbee® (Zigbee is a registered trademark Zigbee Alliance), and, other proprietary and non-proprietary protocols.

DETAILED DESCRIPTION

The present invention provides according to one or more of the following embodiments, systems, methods, computer program products, and related business methods for easy to use residential and commercial power metering, power control, sensors, enhanced safety and security. The embodiments conform to the standards based Internet Engineering Task Force (IETF) IPv6 low power wireless personal area network (6LowPAN) communication for residential and commercial applications. The details of the embodiments described herein use the residential home, primarily the single family home, for context but the teachings are applicable without limitation to other buildings such as multi-family dwelling, commercial buildings used for office space, retail, industrial warehousing, and, manufacturing. Commonly numbered items in all the Figures refer to the same item throughout the description.

Figure 1:
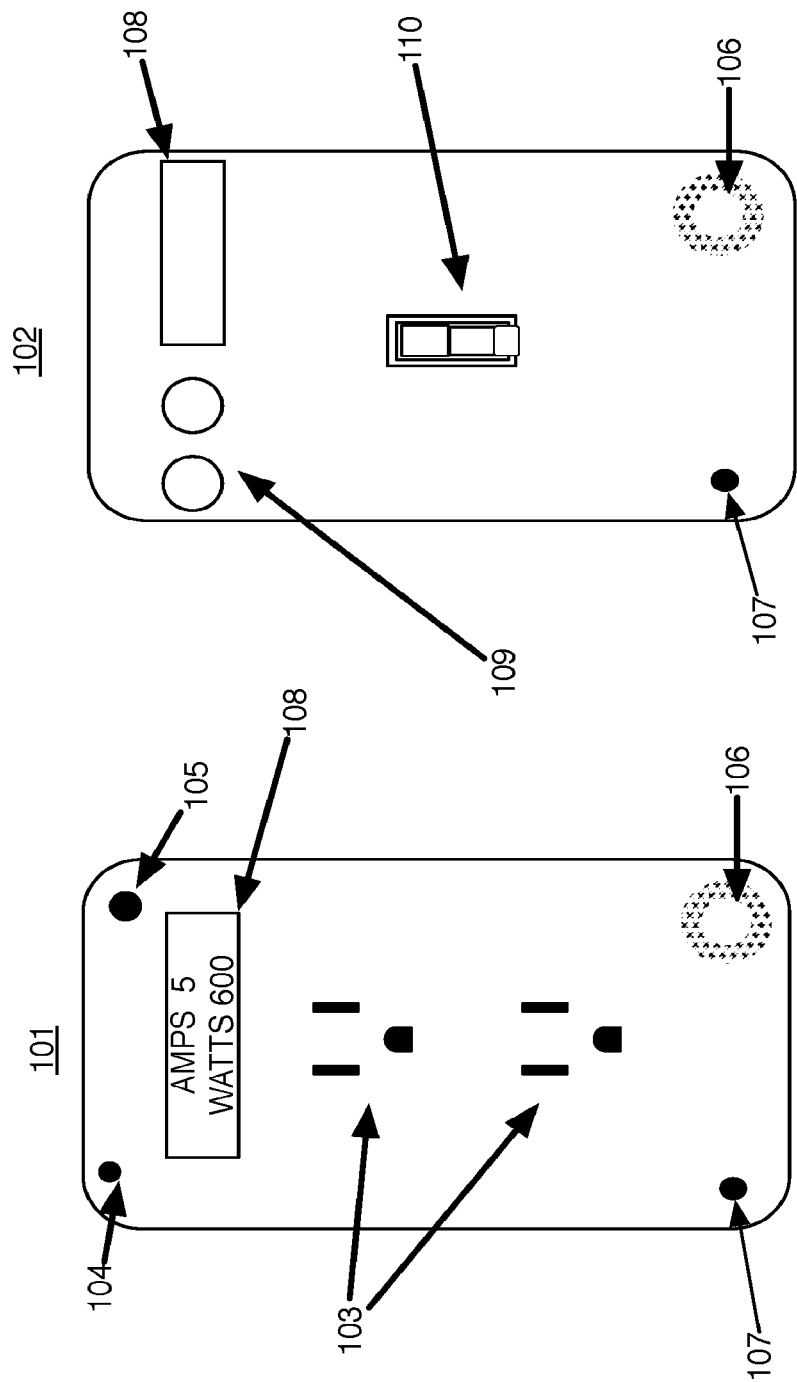
FIG. 1 shows a first embodiment front view of an outlet and switch face plate user interface.

FIG. 1 shows views of faceplates for an outlet 101 and a switch 102 of the present invention. A plurality of both devices are interconnected through a wired or wireless network. In a preferred embodiment the devices are networked using a wireless RF signal and form a mesh network of the all such devices in a building. In one embodiment, all of the networked devices, Outlets 101 and switches 102, include a user interface and display and the status of any of the sensors associated with one device (outlet or switch) of the network is available or display on all of the devices of the network. The outlet includes receptacles 103 for electric plugs as are standard in home, office and industrial buildings. The form shown are for US standard outlets but any of the many configurations for both 110 and 220 volts as are used internationally may be used. The outlets are controlled by electronics installed in the outlet box behind the faceplate as shown in FIG. 1. In one embodiment the faceplates includes a display 108 that shows the status of the circuitry associated with the outlet or switch. In another embodiment the status is shown using light indicator 105, 109, such as an LED indicator. The status indicators 105, 109 may show an overload condition, an on/off condition, status of the network connection or an indication of any of these associated with a different outlet or switch attached to the same network. In another embodiment the outlet includes no displays or indicators of status. However even in this embodiment the status of the outlet is detected by internal electronics and the status may be displayed on other outlet or switch devices in the same network. The control electronics are programmed with a stored, pre-selected maximum load allowed on the outlet. The outlet plugs 103 may each be controlled separately. The outlet further includes an array of sensors 104. Non-limiting exemplary sensors are motion sensors, temperature sensors, humidity sensors, light sensors, Arc-Fault and Ground-fault sensors. The status of any or all of the sensors may be displayed on the display 108 and may further be displayed on any switch 102 or outlet 101 face plate in the networked system of outlets and switch plates. In another embodiment the device may interact with external sensors and actuators. Non-limiting examples of external sensors and actuators include smoke detectors, CO detectors, water leak detectors, hydrocarbon or other gas detectors, switches and sensors that can detect whether a door or window is opened or closed. In a preferred embodiment each switch plate 102 includes: On/Off control 110 with dimming and timer support, a motion sensor, a microphone(s)107 and a speaker(s) 108, room temperature and humidity sensors, power use assessment and power metering sensors. Each switch can be programmed with behavior that depends upon occupancy, temperature, humidity, time of day, and any other measurement as detected by the array of sensors either integral to the particular switch or located elsewhere on the network of switches, outlets, sensors and actuators. In the preferred mode each of the switches has full control of all in-house connected devices. In a preferred embodiment the user may interact with the switch and outlets through a computer application such as the Apple HomeKit® (Apple and Apple HomeKit are registered trademarks of Apple Inc.) Non-limiting actuators include water and gas shutoff valves, garage door openers, electronic locks on doors and windows. The status and control of the various sensors and actuators is available on the particular device, outlet or plug, interfaced to the sensor or actuator as well as all other devices connected to the same mesh network. The other devices include other plugs and outlets as well as any computing device programmed to interact with the network. Such computing devices include programmable telephones, tablets, portable computers and servers. The Outlets and switches each common, similar electronics. In the example shown in FIG. 1, the user interface on the switch faceplate is a simple toggle switch 110. The displays 108 may be programmed to show current nominal operation of the associated circuitry such as current demand and power consumption by a connected load and may show an overload condition such as current greater than a pre-selected limit. Note the limit may be less than the rating of an inline fuse or circuit breaker such that the user can have advanced warning before tripping a circuit breaker. The display parameters and the preselected limit can be set up in the configuration for each outlet using any of the user interfaces on the switch module faceplates or on any computing device connected to the building network that includes the outlet module. In one embodiment the power for each of the outlets 103 are shown separately in the display 108. The display can also be configured to show the current flowing through the plugs and the applied voltage. In another embodiment the display 108 can be configured to show alert messages.

Both the outlet and the switch faceplate examples show positioning of a microphone 107 and a speaker 106 included within the modules. The outlet modules can be configured to use the microphone and speaker in the same ways as the microphone and speaker in the switch faceplate. Non-limiting examples include using the microphone to accept commands for configuration and activation of sensors and actuators on the network, answering phone calls and sounding alerts. In a preferred embodiment the modules further include a motion sensor to detect presence of a person or movement within the vicinity of the module. The individual modules may be configured to be always powered, powered at pre-selected times or powered on the basis of whether the built in motion detector detects someone present in the vicinity of the module.

The faceplates 101, 102 of FIG. 1 show an embodiment where the user interface and displays are fixed in location. Displays may be LCD or LED alphanumeric or graphical displays as well as simple LEDs whose lighting indicates a particular pre-selected condition to alert a user. The user interface may be a toggle switch 110 or mechanical slider (not shown). In another embodiment shown in FIG. 2A the faceplates for the switch are comprised of a flat panel programmable display. The controls and output displays may be located anywhere on the display and are user selectable as to appearance and function.

Figure 2:
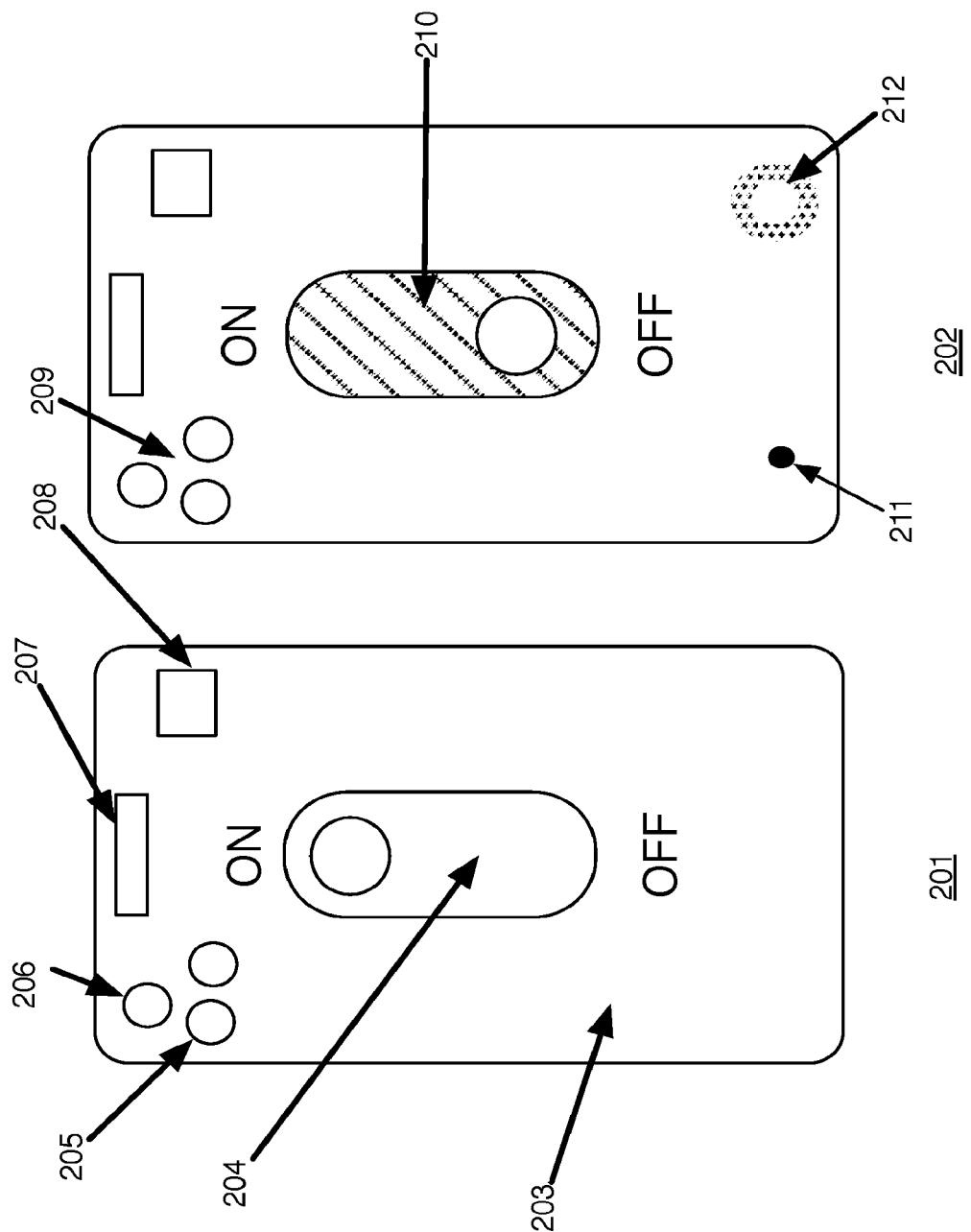
FIG. 2 shows a front view of a switch face plate and a programmable user interface.

The views show the switch in an off 201 and an on 202 position. The faceplate includes a touch interactive screen 203. The form of the screen is user selectable. The background color of the screen, is selectable by the user and may further be programmed to change as a function of a wide variety of parameters. Nonlimiting examples of such parameters include date and time, output of sensors either in the particular switch module or to sensors anywhere on the network formed by the switch and outlet modules, and an incoming or outgoing phone call, email or instant message received by a cellular telephone linked to the network of the switch and outlet modules. The user interface faceplate can further be programmed to show a variety of icons and information. In the example shown the switch faceplate is programmed to display a slider switch 204, 210 that changes color depending upon whether it is in the off 204 or on 210 position. The examples shown further show a display of the status of doors 205, 209 where the icon changes colors or otherwise changes appearance to show whether the door is opened, or closed, or locked or unlocked. A status indicator 206 shows the status of the network connection to the particular faceplate. A status indicator can also show the status of the entire network rather than the status of the connection to the particular switch module. The date and time 207 can be optionally displayed as well as environmental conditions such as temperature and humidity 208. The temperature and humidity may be selected as the temperature and humidity in the environment of the particular switch module or the temperature and humidity of a switch or outlet module remote from the particular module of the display or the temperature and humidity of sensors that are interconnected to the network and may therefore be remote temperature and humidity modules. In one embodiment the faceplate and associated electronics include a microphone and speaker (not shown). The display may further includes icons 211, 212 for the microphone and speaker showing whether the the microphone and speaker are activated. In the example of FIG. 2, the first view 201 shows a system where the microphone and speaker are not active and the second view 202 shows a module where the microphone and speaker are active by virtue of the appearance of an indicator 211 for the microphone and a second indicator 212 for the speaker. In another embodiment the icons 211, 212 indicate whether a microphone and speaker exist in the particular module and change colors upon activation of the microphone and/or speaker. In the embodiment of FIG. 2A the appearance and location and means for activating of all 203-212 of the user interfaces and displays are programmably selectable. The switch modules 204, 210, for example, may be toggles, buttons, or sliders (as shown) and be activated by a swipe of the finger, a press of a finger, a tap or other actions in the region 204, 210 of the switch display.

Figure 3:
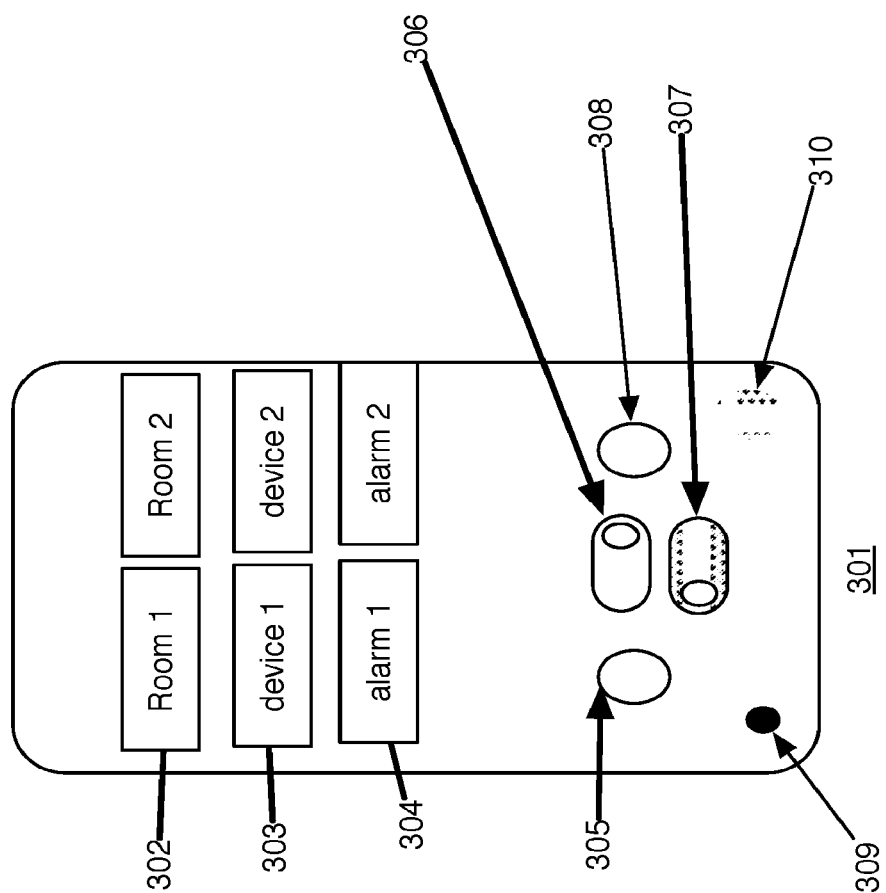
FIG. 3 shows a second view of a switch face plate and a programmable user interface.

FIG. 3 shows a design for a switch faceplate module/user interface in a different configuration from that shown in FIG. 2. The user interface of FIG. 2 and the user interface shown in FIG. 3 may be selected by the user. The view 301 shows a configuration in which the status and control of a plurality of lights located throughout the building that includes the network. The status is shown in a plurality of regions 302, for a plurality of devices 303, and for a plurality of alarm statuses 304 of the touch screen faceplate for the switch module. Each of the regions 303 further represents a touchscreen region whereby the user may tough the screen in that region to change the status of the particular selected device on or off. The user interface represented by the touchscreen faceplate on all of the switch modules may be programmed to show a similar or modified user interface to control the lights or any other interconnected actuator or appliance throughout the building. The selection of the particular display is made through programming the microprocessor included within the electronics of the switch or outlet module. In the embodiment shown in FIG. 3 the selection of the display may be made through a touch of the configuration region (not shown). In another embodiment the configuration and display may be set through use of a voice command. In another embodiment the configuration may be set through use of a password. The password may be entered through the user interface using a displayed keypad. In another embodiment the password is entered through a vocal command received by the microphone built into the electronics of the switch or outlet module. The display shown in FIG. 3 may be toggled to the display shown in FIG. 2 through touching the selection region 308. In another embodiment a library of different displays are pre-defined through the configuration process and the user may select which of the selected displays and user interfaces to show through touching a "favorites" region 305 on the touchscreen user interface. In the example shown the original single switch functionality of FIG. 2 is shown for a pair of switches 307, 308. The switches 307, 308 may control activation and deactivation of devices in the same locale as the faceplate 301 or in locations remote from the faceplate 301 but connected to the same network.

Figure 4:
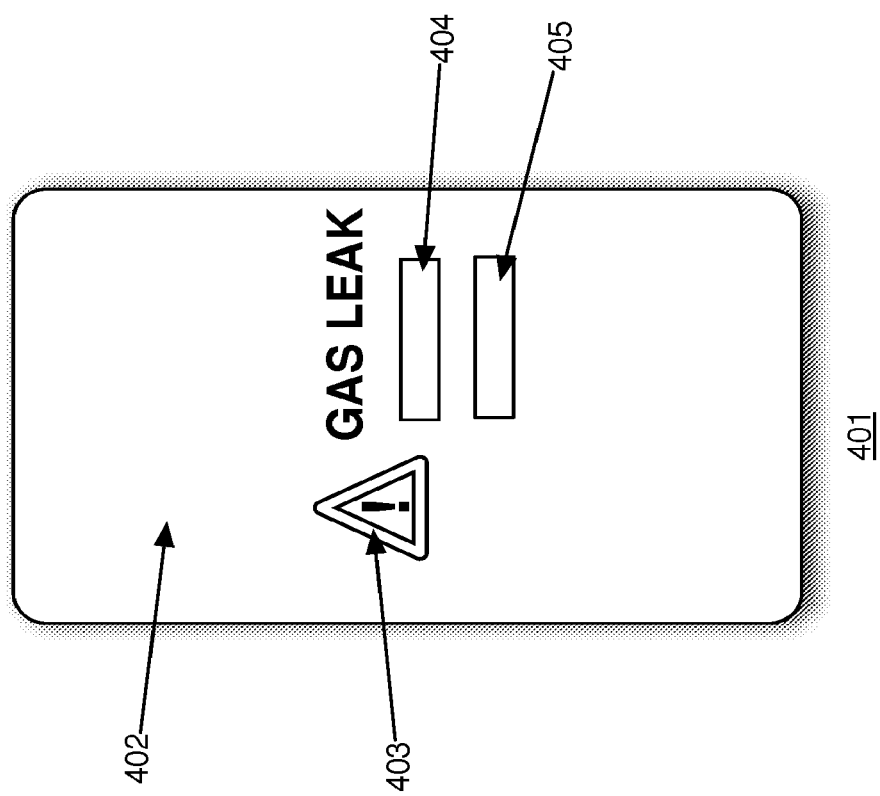
FIG. 4 show a view of a switch face plate and a programmable user interface showing an alarm condition.

FIG. 4 shows an embodiment of a programmable display for a faceplate that shows an alert situation, in this case a gas leak. The display 401 includes a programmable touchscreen display 402 where a microprocessor (not shown) located physically in the same location as the faceplate or remote from it, receives a signal from a sensor. There are preselected limits on values received from the sensor and if outside of those limits, an alarm is set and in this case the microprocessor is further programmed to display an alarm condition as shown in the FIG. 401. The alarm condition display may include information 403 as to the nature of the alarm and regions 404 or further specific information such as the location of the sensor that triggered the alarm. The display may be further programmed to include user interaction regions 405. The user interactions may trigger actions such as turning on a siren alarm to evacuate the building or triggering a networked communication device to issue a warning such as sending a text message or calling an emergency number for aid. The alarm condition may result where a signal from any of an array of sensors included in the outlet box, switch box or wired or wireless connected to the electronics contained in the outlet box or switch box, that is outside of a pre-selected value. the selection of whether to display and upon which of the switch modules to display notices is selectable by the user in the configuration procedure. The user may select to display the alerts and notices on all of the switch and outlet modules within the network system or a selected few of the switch and outlet modules, as well as to broadcast the message through an internet connection to selected telephones, personal computers and servers. The sensors may be for gas leaks, water leaks, intrusion, over temperature, under temperature, and from any other type sensor that may be attached to the network. The alarms may be triggered both by a sensor value coupled with a second programmed parameter such as the date and/or time of day.

Figure 5:
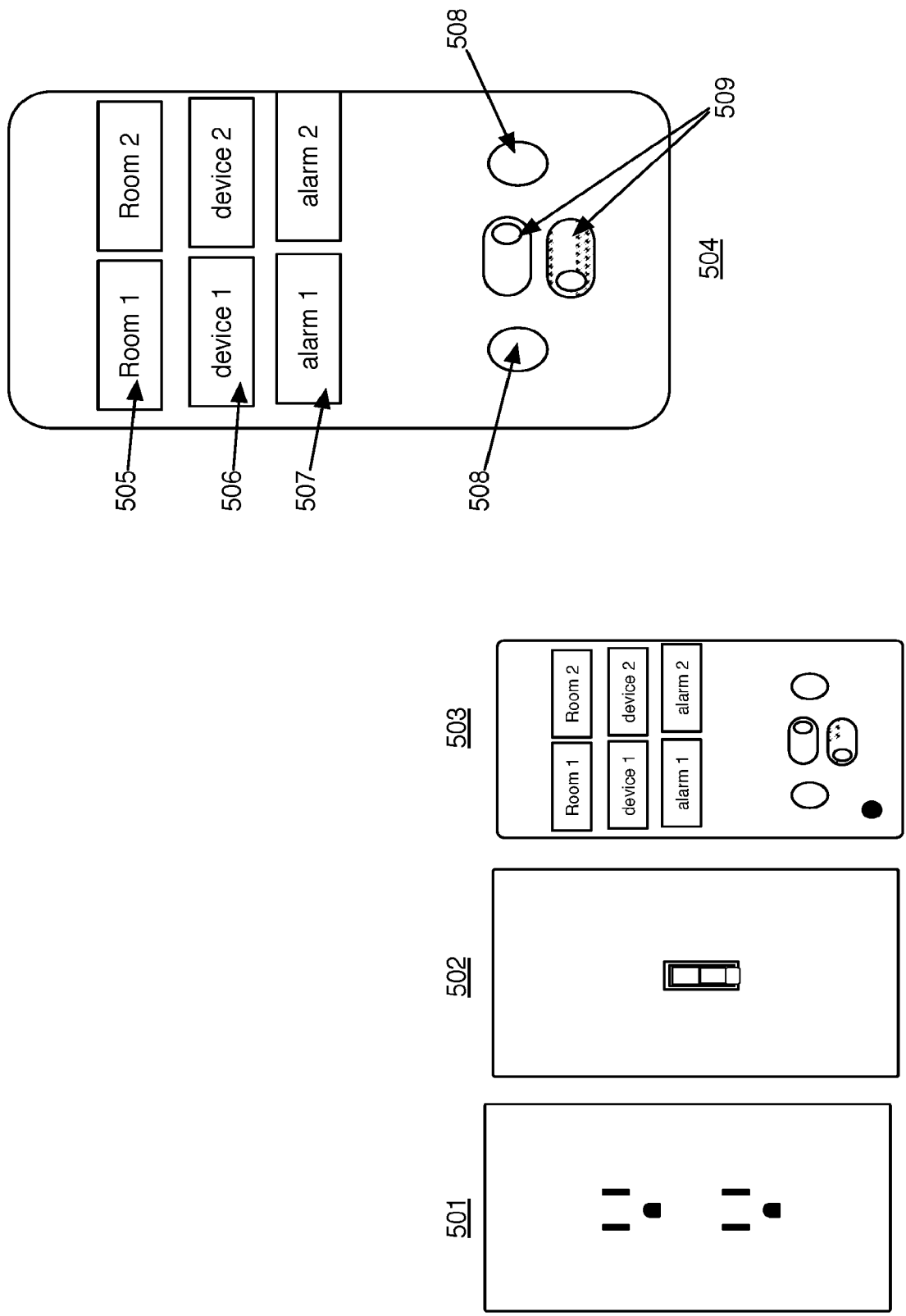
FIG. 5 shows a second embodiment front view of an outlet and switch face plate and a user interface included on a separate device.

In another embodiment, shown in FIG. 5, the user interface is located on a portable computing device 504. The faceplate of the electrical box may be as is used in prior art, a conventional outlet box 501 or a conventional switch box 502 or may be as is used in the present invention and described above, and, the switch faceplate is a touchscreen user interface 503. The portable computing device may include a display that mimics that of the faceplate, as shown in views 503 and 504, or may be the only user interface for the system and the electrical boxes and faceplates are as shown in views 501, 502 and the user interface is on a portable computing device 504. The display on the device 504 is user selectable using touch interaction regions 508 and includes interaction areas 509 for activation and deactivation of switches, outlets and other actuators that are connected to the networked system of electrical boxes. The portable computing device 504 may further display, by selection of the user, the status of electrical boxes in particular rooms 505, the status of particular electrical devices 506 and alarms 507 triggered by sensors connected to the system.

Figure 6:
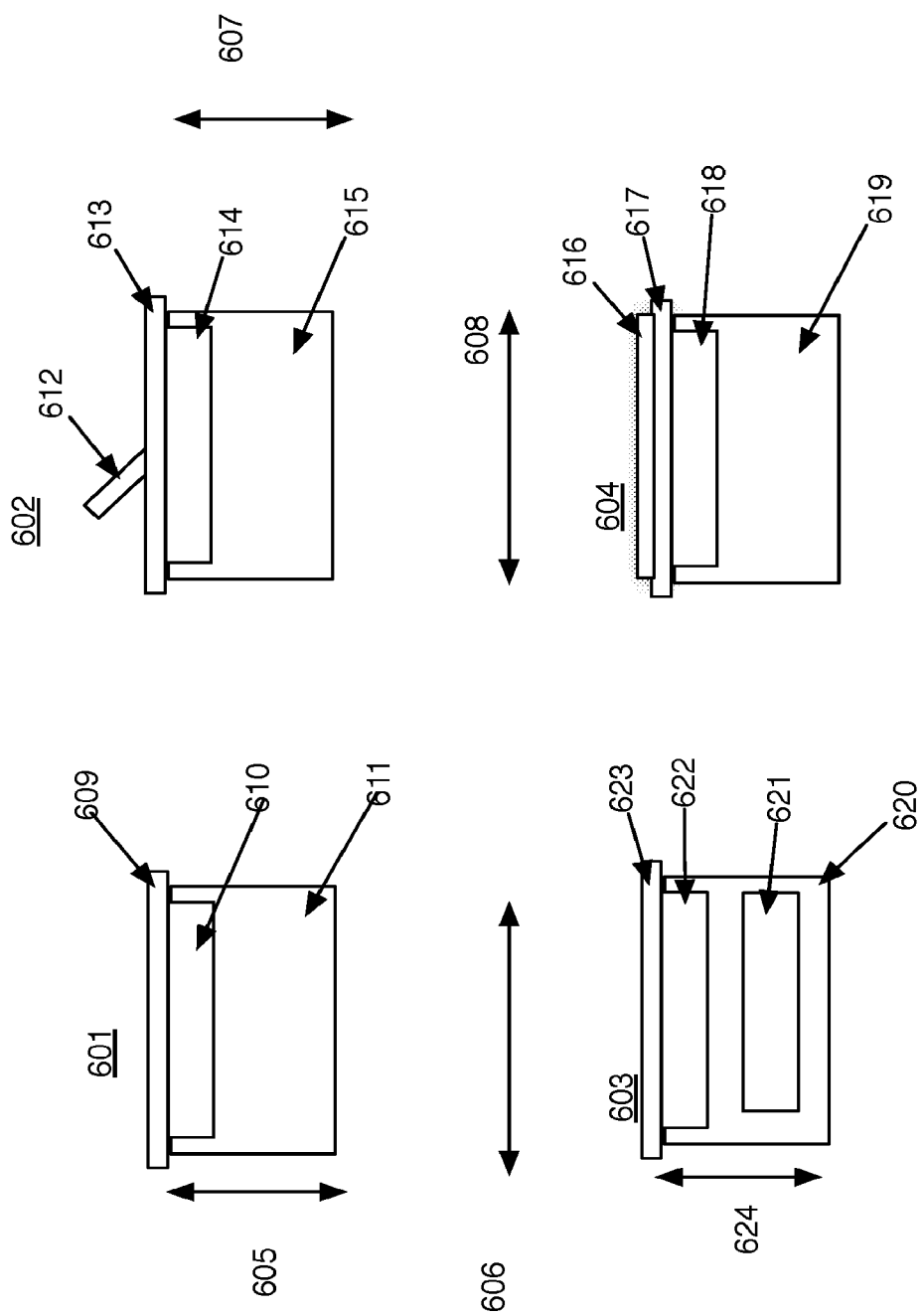
FIG. 6 shows cross-sectional views of the invented electronics in a standard electrical box.

FIG. 6 shows side views of physical form prior art 601, 602 and the invented device 603, 604. The prior art outlet 601 and switch 602 devices are installed in electrical boxes 611, 615 that are of a standard form and have standard dimensions of height (not visible in the view) and width 606, 608 and depth 605, 607. In a preferred embodiment, the invented devices of and outlet 603 and switch 604 fit into boxes 620, 619 that have the same dimensions 606, 608, 624 as the standard prior art boxes. In this manner the invented switch and outlet boxes can be a direct physical replacement for the prior art switches and outlets. The prior art outlets are comprised of a faceplate 609, the receptacles themselves 610 and a container box 611. This is replaced by the current invention outlet 603 with a faceplate 623, the electrical receptacles 622 and the control electronics 621 all contained in a box 620 of the same dimensions. In another embodiment, the outlet electronics 621, 622 and outlet faceplate 623 are installed in a pre-existing electrical box 620. The same can be true for a switch where the switch electronics 618 and faceplate 617 are installed in an existing electrical box 619. The prior art switch 602 is comprised of a mechanical interface 612, a faceplate 613, the switch electronics, typically also mechanical, 614 enclosed in an electrical box 615. The instant invention uses an equivalent electrical box 619 to enclose the programmable electronics 618, a faceplate 617 and a touch screen display 616 that replaces the functionality of the mechanical interface 612 of the prior art and adds display capabilities.

Figure 7:
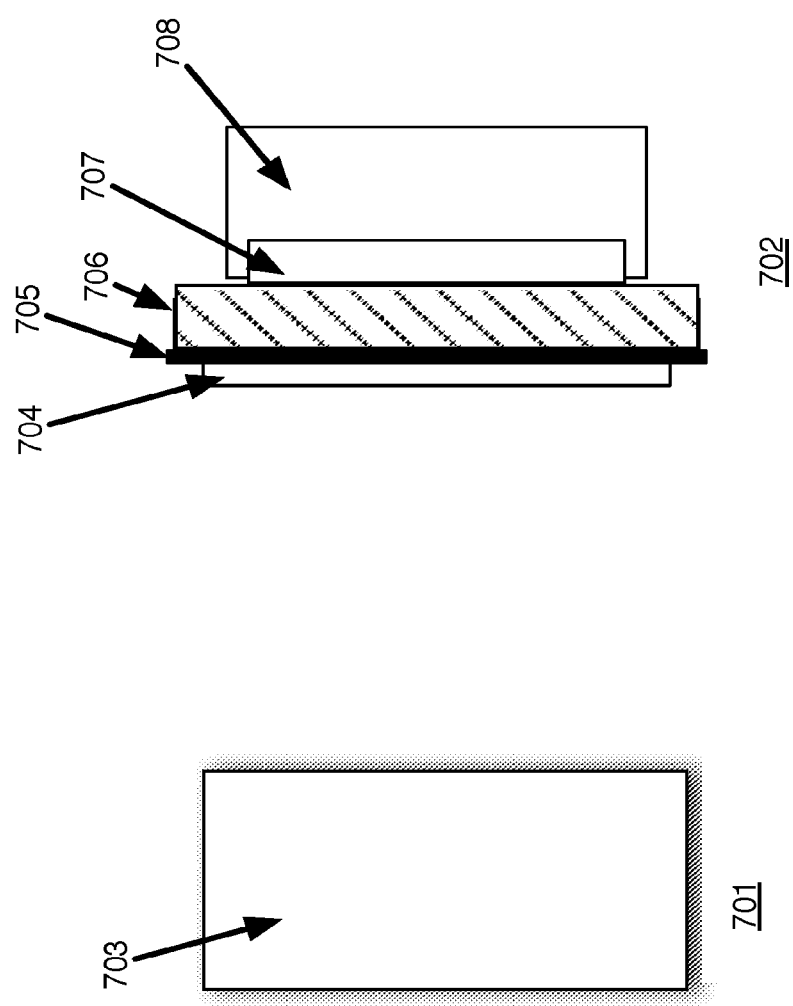
FIG. 7 shows front and cross-sectional views of the invented electronics in an electrical box with a removable user interface faceplate.

FIG. 7 shows a front view 701 of the switch and a side view 702 of an embodiment of the physical form of the switch or outlet. The front face 703 of the switch is a touch screen display that may be programmed to show a preselected list of notices and sensor status for sensors attached to the network o fall of the switches and outlets included in a building. The Switch may also be programmed to be a blank display as shown here in black until a motion sensor senses that a user is in the proximity. In another embodiment the switch is programmed to react to a particular user through either voice activated password control, voice recognition password control or sensing of a particular connected device such as a wirelessly linked programmable telephone, an wireless fob or other similar devices. In one embodiment the user is recognized by a bios sensor or a particular encoded pattern of touches to the user interface touch screen 703. The screen 703 shown in black may be programmed to display a range of colors including colors to match the decor of the room in which the switch is installed and to show a changing shade of colors as a function of time or identity of the user sensed in the room.

The side view 702 of the switch device shows an embodiment of the device installed in an electrical box 708 that is installed through the wall 706 of a building. In this embodiment the faceplate/user interface/display 704 is removably attached to the electronics 707 by sliding into a slot 705 that firmly folds the faceplate to the box 708 and includes electrical contacts (not shown) that connect the face plate 704 to the electronics 707 when the faceplate is in position as shown.

Figure 8:
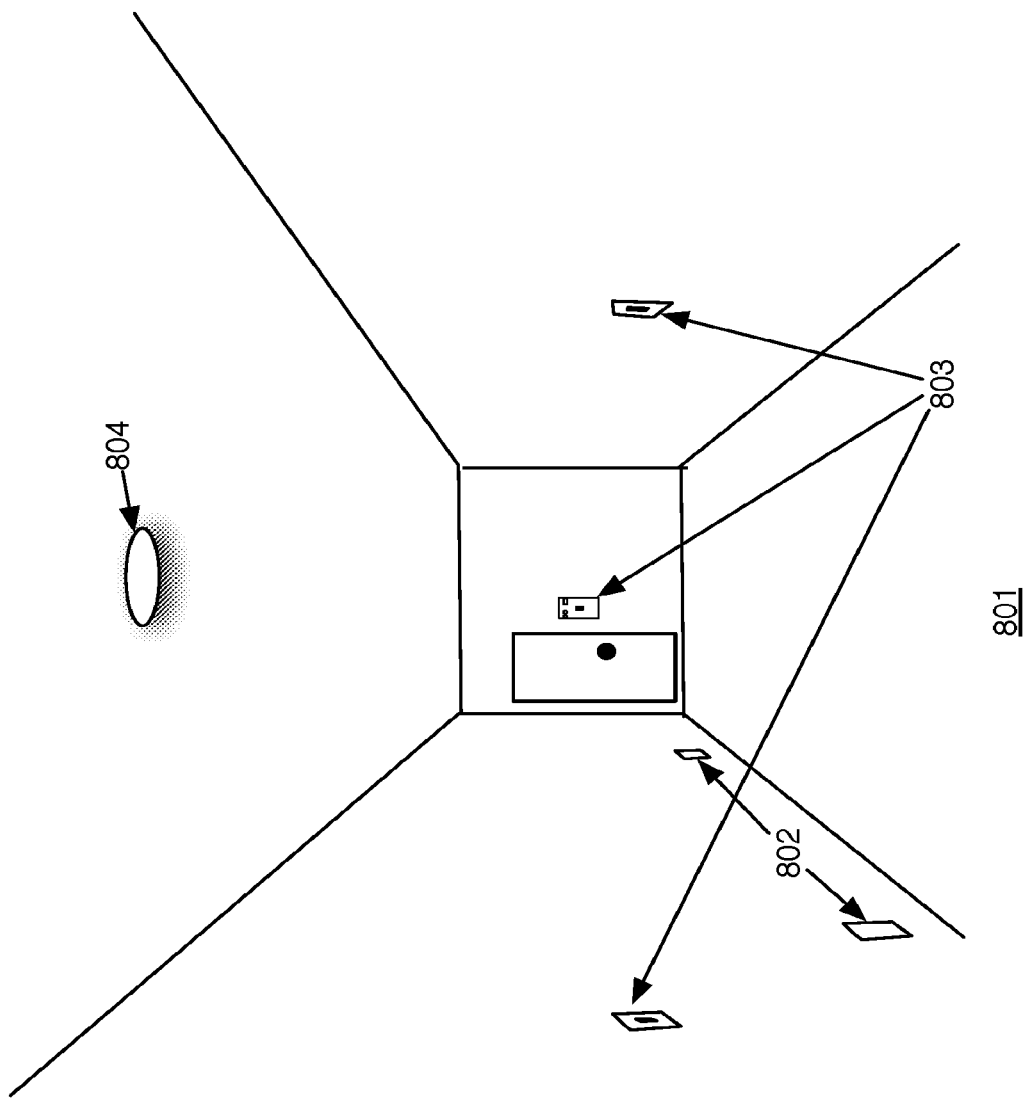
FIG. 8 shows a typical room with a plurality of installed invented outlet and switch boxes.
Figure 9:
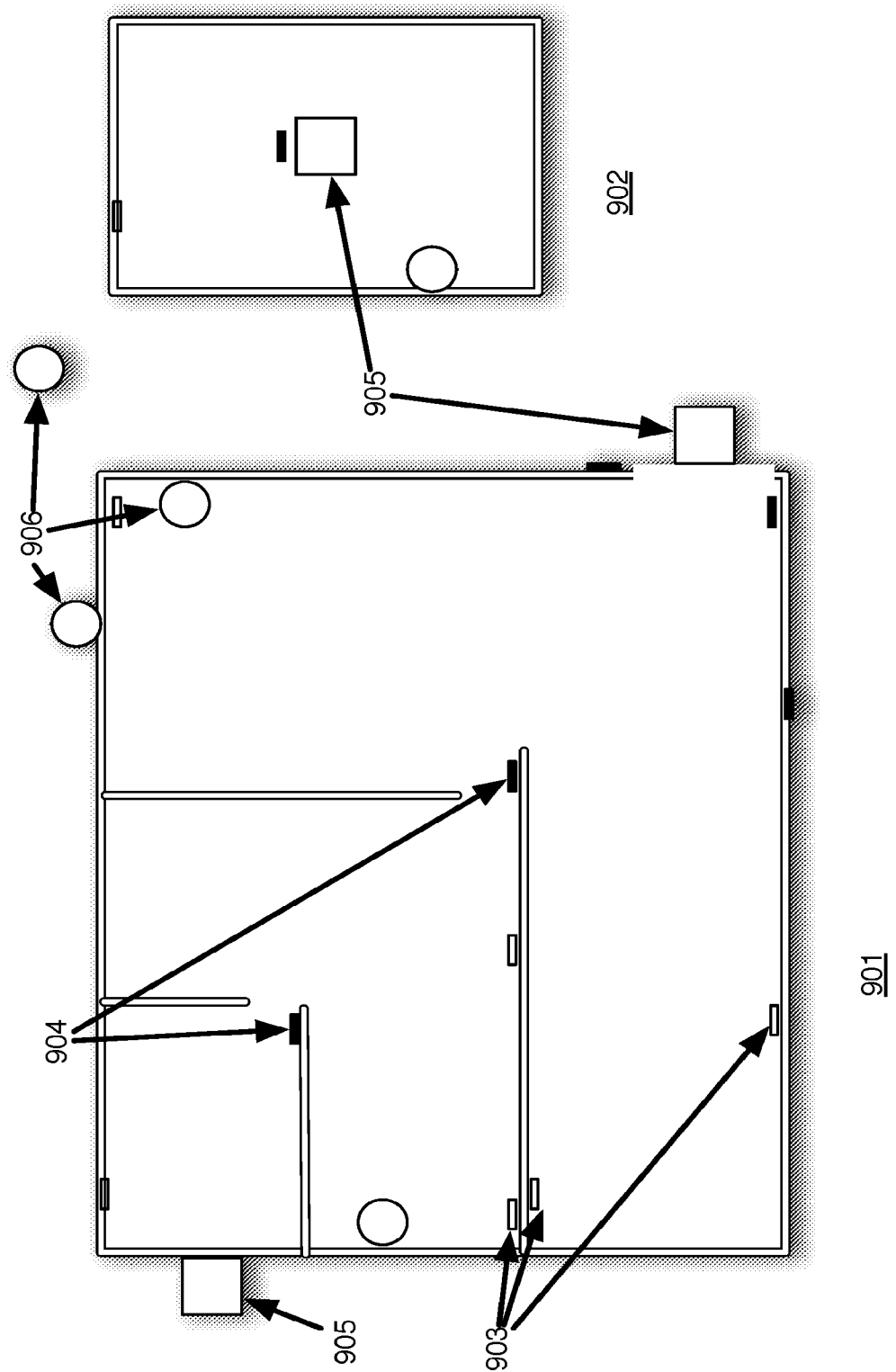
FIG. 9 shows a floor plan with a plurality of invented electrical box installations.
Figure 10:
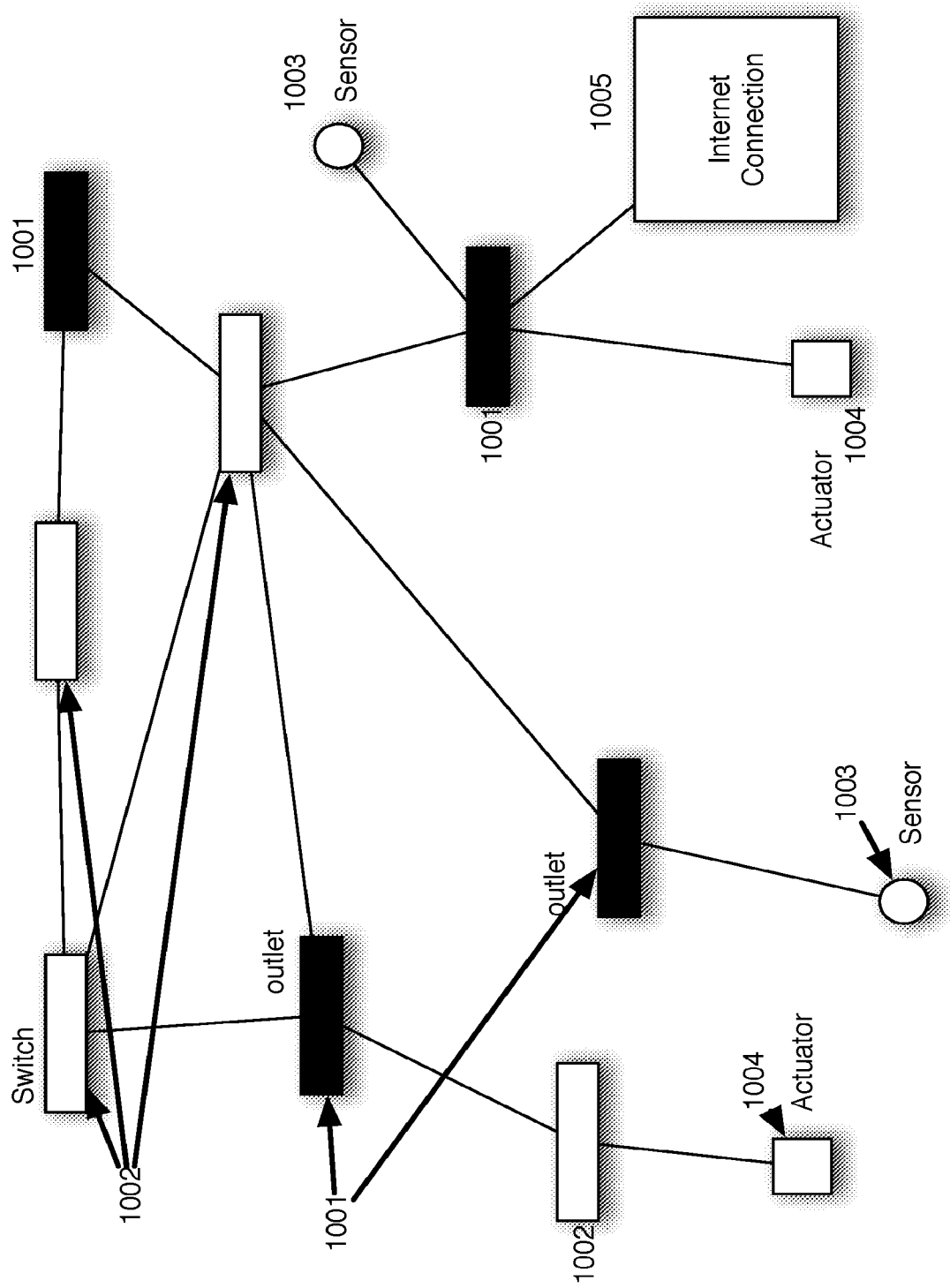
FIG. 10 shows a diagram of a communication network formed amongst a plurality of installed outlet and switch boxes.

FIG. 8 shows a typical room 801 in a house that include outlets 802, switches 803 and other electrical devices such as hard wired lighting 804. Each of the devices 802-804 would include electrical boxes that in the present invention include the electronics described in FIGS. 1-7 and the following Figures. FIG. 9 shows a typical building that includes a plurality of rooms. The floor plan includes a main building 901 and a nearby building 902. Typically, these would represent a house 901 and a garage 902. However, the invention is equally well adapted to a plurality of neighboring buildings, be the used for residential, retail or manufacturing purposes. The building automation system is comprised of a plurality of wall switches 903, shown here in a white, a plurality of outlets 903 shown here in black, a plurality of sensors 906 that are external to the sensors included in the outlets 904 and the wall switches 903, shown here as circles, and a plurality of actuators 905, shown as squares. Nonlimiting examples of the sensors 906 include motion detectors, security cameras, smoke detectors, CO and Radon detectors, and flooding or water detectors. Non-limiting exemplary actuators include window and door locks, alarms, garage door openers, thermostats, appliance control devices such as settings for appliances and turning appliances on and off, shutoff valves for gas and water and shutoffs for the main building electricity. Sensors are connected to the building automation system through connections to nearest neighbor outlets 903 and switch boxes 904 through either wired or wireless means. Each of the external sensors 906 and internal sensors contained in the switches 903 and outlets 904 provide sensor data to the network of devices. The sensor data from any of the sensors is available to all of the output devices contained in each of the switches 904 and outlets 903. That is a user has the option to display the measurement results from any of the sensors on any of the devices 903, 904. Further the user may set pre-selected limits to the measurements from any of the sensors that may at the option of the user display alerts on any of the devices 903, 904. The switch and outlet boxes and their interconnected sensors and actuators form a mesh network as shown in FIG. 10. Outlets 1001, shown as dark boxes, and switches 1002, shown as white boxes are interconnected by wired or wireless means and similarly linked to sensors 1003 and actuators 1004. All switches and outlets are interconnected either through a direct connection or indirectly through nearest neighbor connections. The microprocessor and the wireless communication port are programmed to form a mesh network thereby interconnecting the plurality of electrical modules. A protocol for the mesh network includes bypassing an electrical module that is not responding.

In a preferred embodiment any of the switch touch screen user interfaces may be used to control the output from the switch to which the user interface is physically attached or to control the output from any other switch or outlet on the mesh network. This means that there is no longer a need for such prior art devices wired as a duplex or n-plex switches that enabled control of a single light or outlet from two (duplex) or n (n-plex) locations. The mesh network enables under program control for any switch or touchscreen user interface to control any or all of the other output devices on the same mesh network. The interconnection, directly or indirectly of all of the outlets and switches enables all the outlets and switches to have access to data generated from sensors 1003 and actuators 1001. Note as already described sensors may be located separate from the outlets and switches or incorporated into the electronics of the outlets and switches themselves. All of the outlets and switches may be used as a user interface as for the local switch as well as any other switch or outlet on the network. In a preferred embodiment the mesh network thereby created of the outlets and switches is further connected, again by wired or wireless means to an Internet connection 1005 that allows both data access and control of all components on the mesh network by authorized computing devices connected through the Internet. Non-limiting external authorized computing devices can include cellular telephones, tablets, personal computers and servers. The network established through the interconnected switch and outlet modules that are further interconnected to external sensors and actuators enables a complete home automation system.

Figure 11:
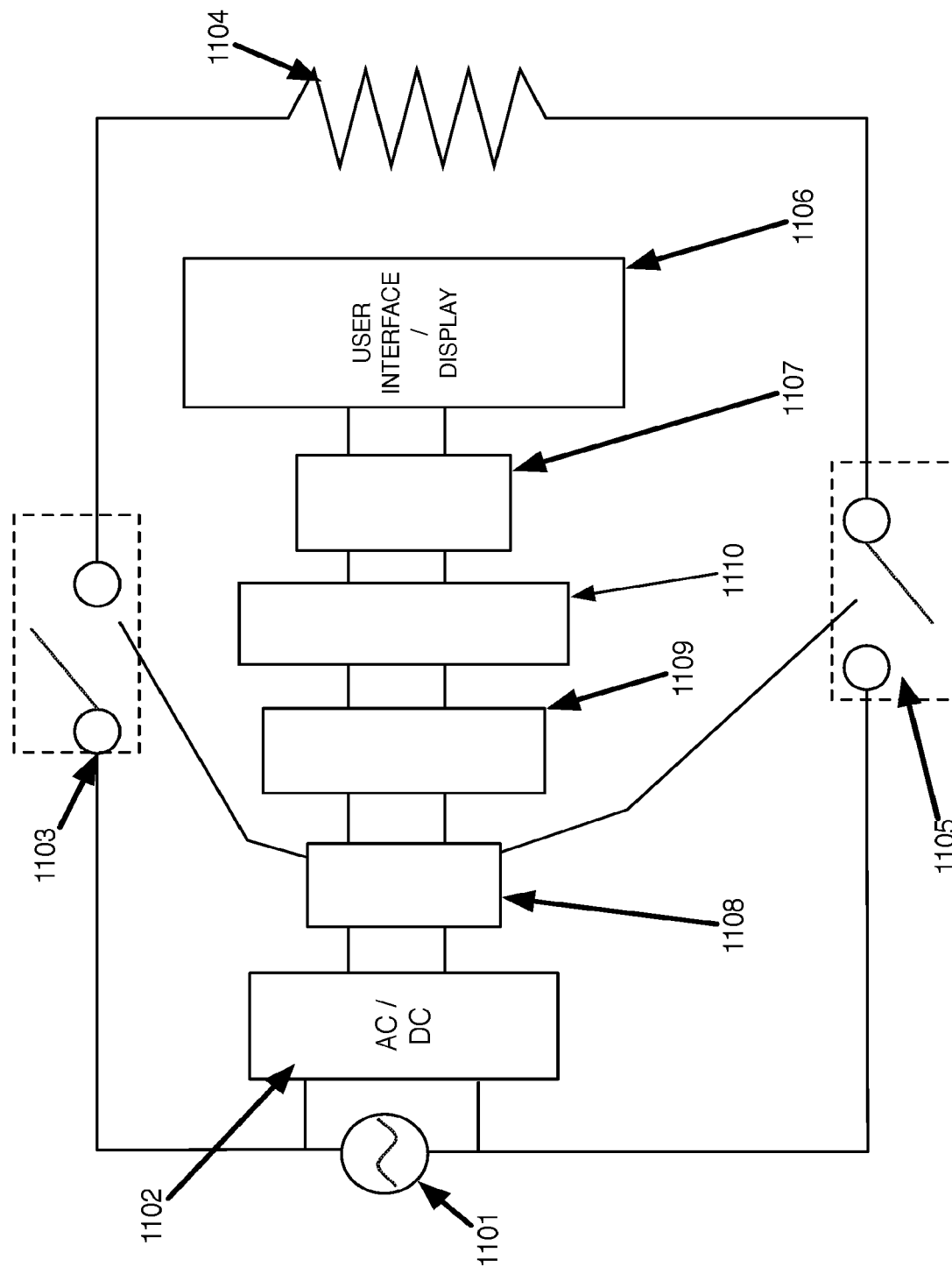
FIG. 11 shows a block diagram of the invented electrical box.

The components included in each of the electrical boxes are shown in FIGS. 11. An AC source 1101 is attached to the load 1104 through a bidirectional switch 1103. In the preferred embodiment a first bidirectional switch 1103 is located on the line side and a second bidirectional switch 1105 is located on the neutral side of the load 1104. In another embodiment, not shown there is a single bidirectional switch on either the line or neutral side. That is there is only switch 1103 or switch 1105 but not both. In yet another embodiment, not shown, there is a third bidirectional switch that is placed to selectively bypass the load 1104. A low voltage AC to DC converter 1102 supplies DC power to the internal electrical components 1106-1110. The electrical components include a user interface 1106, an I/O 1107, a switch controller 1108, a sensor array 1109, and a microprocessor 1110. In one embodiment the user interface 1106 includes a touch screen display. In one embodiment the user interface 1106 includes a speaker. The microprocessor 1110 is a computing device microcomputer that can be programmed to control the switches 1103, 1105 and to display notices and accept input from the user interface 1106 and accept signals from the sensor array 1109. In a preferred embodiment, the I/O 1107 includes capabilities to communicate wirelessly to other switch and outlet devices on the same network as well as communication to other devices such as smart phones, tablets and computers that may access the switch or outlet. In a preferred embodiment the components are mounted on a single circuit board. In another embodiment all the silicon components are part of a single chip. The sensor array 1109 includes at least one selected from a voltage sensor, a current sensor, a temperature sensor, a humidity sensor, a motion sensor, a microphone, a load identifying sensor and a ground fault and arc fault detection sensor. All sensors may be incorporated in the same electrical supply unit. The sensor array may also include sensors and actuators that are remote from the switch or outlet unit and connected by wired or wireless means. The preferred embodiment is an electrical supply box that includes the elements: an AC to DC converter 1102 at least one bidirectional switch 1103, 1105, a switch controller 1108, a plurality of sensors 1109, a microprocessor 1110, an I/O port 1107 and a user interface 1106. The plurality of sensors 1109 include voltage sensors, current sensors, a load identifying sensor and a fault detection sensor. The preferred embodiment of the AC to DC converter, the bidirectional switch, the load identifying sensor and the fault detection sensor are as described in detail below. The user interface 1106 may be local and range from a simple switch to a touch screen display and may be located in the electrical box or optionally may be located on a remote, portable computing device.

In another embodiment each of the electrical boxes 903, 904 (FIG. 9) includes a temperature sensor, a humidity sensor and an associated physical location of the electrical box. A microprocessor associated with the network of electrical boxes is programmed to calculate a three dimensional profile of the temperature and humidity in the three dimensional space occupied by the plurality of electrical boxes. In another embodiment the three dimensional temperature and humidity profile is calculated at a plurality of times and the changes of the successive three dimensional temperature and humidity profiles over time are used to calculate a moisture and heat flow profile for the three dimensional physical space occupied by the plurality of electrical boxes.

Details of individual components that are included in preferred embodiments follow in FIGS. 12-25.

AC To DC Converter

Figure 12:
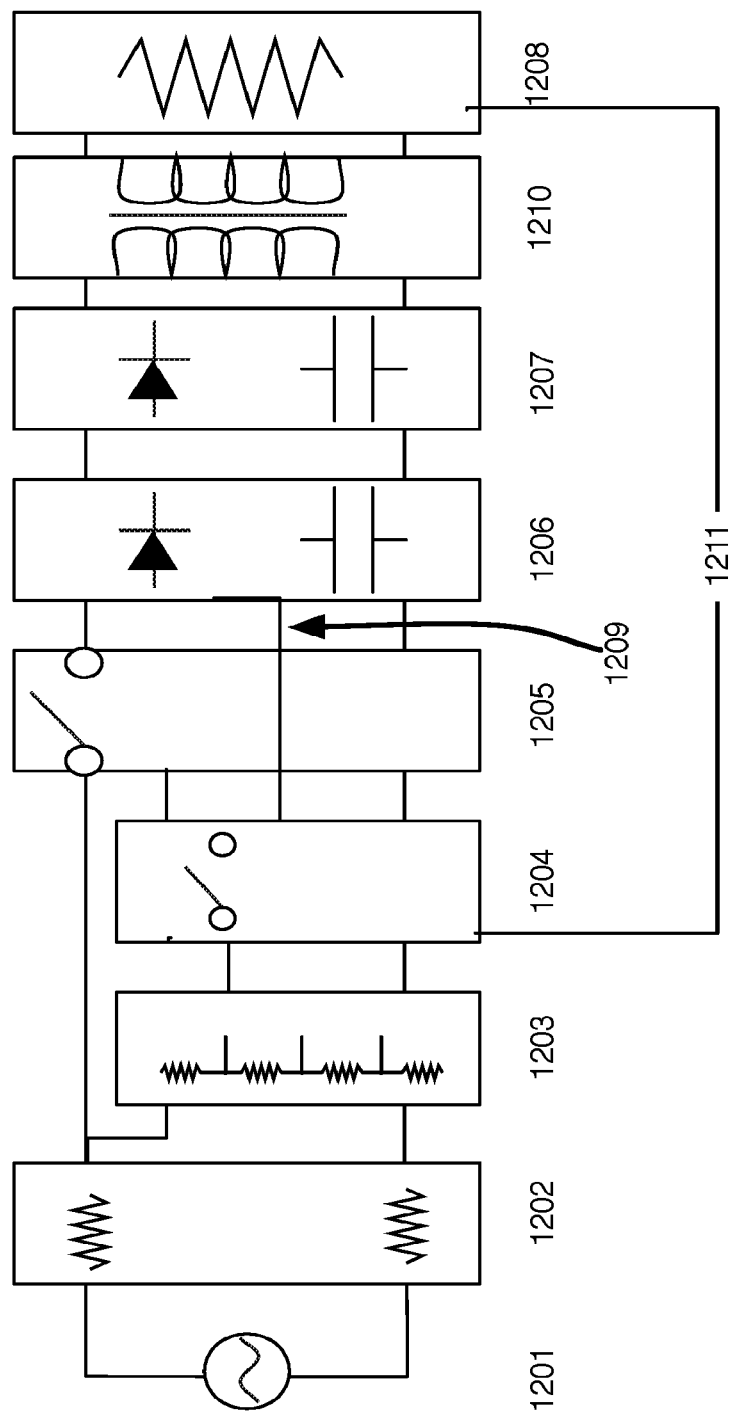
FIGS. 12 and 13 show details of the preferred embodiment of the AC to DC converter.
Figure 13:
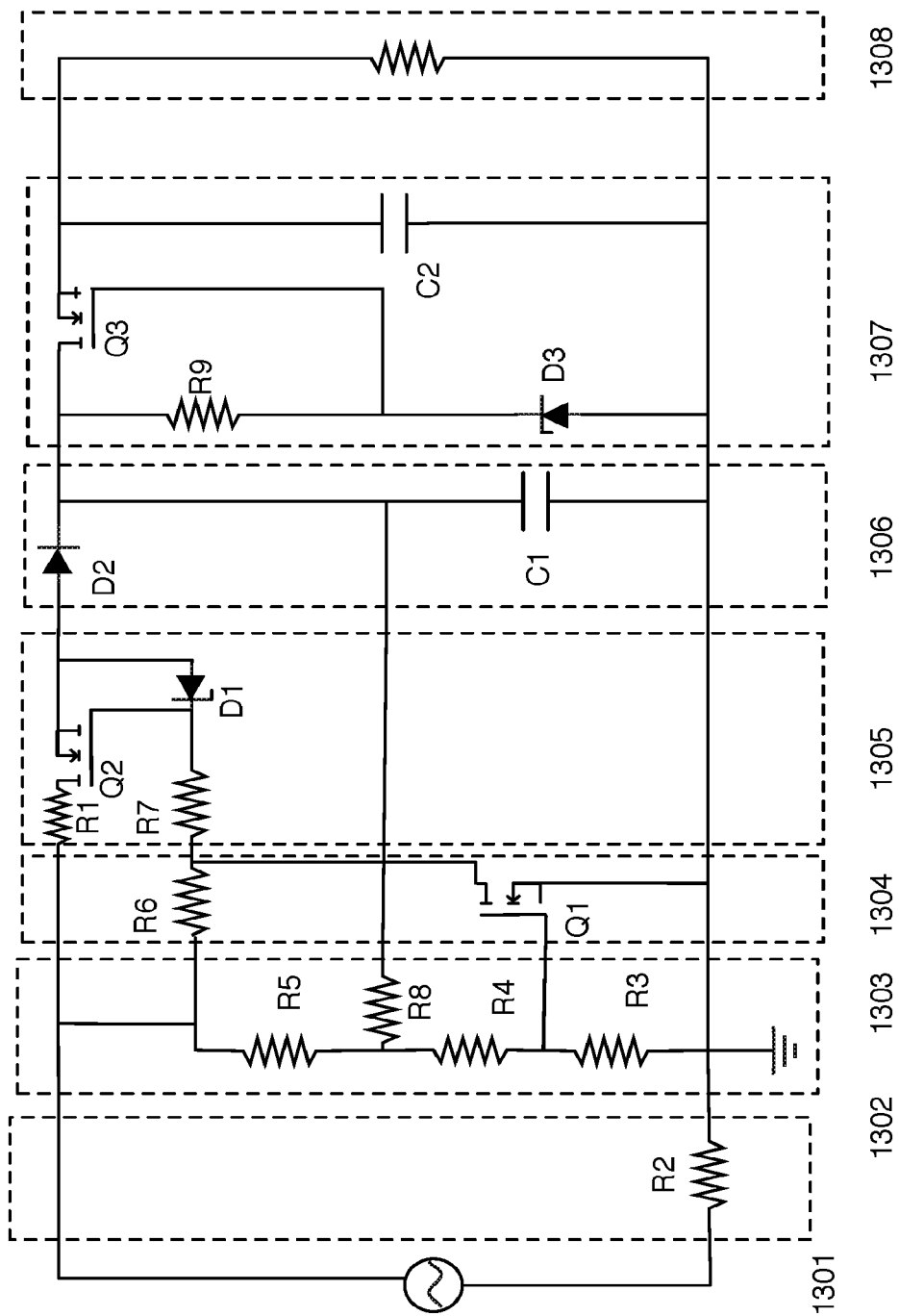

The AC to DC converter, that does not require a rectifier, is comprised, generally, of the elements shown in FIG. 12 and the method implied by these elements. A non-limiting specific example of the circuit elements is shown in FIG. 13. Referring to FIG. 12 the AC source 1201 is connected to an inrush protection element 1202. In one embodiment the inrush element is comprised of resistor elements in the line and neutral of the AC supply. In another embodiment, where higher power and efficiency is required the inrush protection includes switch elements that provide high resistance at startup and switch the resistor elements out of the circuit at steady state operation. After the inrush protection the AC source is sampled using a sampling element 1203. In one embodiment the sampling element 1203 includes resistors configured into a voltage divider network. In another embodiment the sampling element includes a reference voltage source and comparator. In another embodiment the sampling element can be manually adjusted. In another embodiment the sampling element can be automatically adjusted. The sampled voltages are used as supply to a switch driver element 1204. In the preferred embodiment, the switch driver element 1204 receives a feedback voltage signal 1209 from the storage element 1206 and based upon the voltage signal, controls the voltage applied to the gate of a switching element in the control switch and clamp element 1205, thereby opening and closing the control switch 1206 to supply power to the storage element 1206 and ultimately the load 1208. In one embodiment, where the feedback 1209 is removed, the AC to DC converter is a feed forward converter where charging of the storage element 1206 is controlled from the the forward side 1203, 1204 and 1205. Addition of the the feedback control 1209 provides a means for both feed forward and feedback control. In one embodiment the balance of feed forward and feedback control is determined by the selection of components in the voltage sampling element 1203 and the feedback line 1209. In one embodiment the balance of feedforward and feedback control is determined by resistor elements in the sampling element 1203 and the feedback 1209. In another embodiment variable elements are used such that the feedforward and feedback control can be adjusted. In a preferred embodiment the switch driver is comprised of a voltage divider and a switch. The switch and clamp element 1205 controlled by the switch driver 1204 provides pulsed power at a fixed maximum current to the storage element 1206. In the preferred embodiment the switch and clamp element is comprised of an N-MOSFET and a Zener diode, connected source to gate, limits/clamps the peak voltage, and therefore peak current, to a pre-selected peak voltage value. In one embodiment the preselected limiting voltage is determined by value of the Zener voltage of the Zener diode bridging gate to source of an N-MOSFET component of the switch 1205. Power from the switch and clamp element comprised of pre-selected peak current pulse is provided to a storage element 1206. In one embodiment the voltage regulator is comprised of a capacitor used as an energy storage element and a diode. Charge on the capacitor is fed back through a voltage divider circuit to the switch driver 1204 thereby maintaining a constant charge on the capacitor. Output from the the storage element is fed through a voltage regulator 1207 to the load 1208. In another embodiment the AC to DC converter further includes a galvanic isolation element 1210. In another embodiment the AC to DC converter further includes elements 1211 that enable feedback from the load 1208. In the preferred embodiment the feedback circuit 1211 also includes galvanic isolation between the control element 1204 and the load 1208.

FIG. 13 shows the preferred embodiment of the AC to DC converter. Elements 1301 through 1308 correspond to elements 1201 to 1208 of FIG. 12 respectively. The AC source 1301 is connected to the inrush protection circuit 1301 comprised in this preferred embodiment of resistors R1 and R2. In another embodiment (not shown) the inrush protection includes switches such that the current flows through the resistors R1 and R2 at startup and bypasses the resistors once steady state operation is reached. In another embodiment the inrush control uses inductors; that is elements R1 and R2 are replaced with inductors L1 and L2. Output from the inrush protection goes to the switch Q2 of the switch and clamp circuit 1305 and to the voltage sampling element 1303. The voltage sampling element 1303 is comprised of resistors R3, R4, R5 sampling the AC input and resistor R8 providing a feedback voltage from storage capacitor C1. The values of R3, R4, R5 and R8 are selected such that the voltage to the gate of switch Q1 in the switch driver element 1304 turns switch Q1 on and off and thereby synchronously turns switch Q2 off and on thereby providing a preselected timed output pulse from switch Q2 to charge storage element C1. Resistor R8 provides a feedback path as to the charge on capacitor C1 and therefore the output voltage to the voltage sampling circuit 1303 and therefore to the control circuit 1304. The switch and clamp element 1305 is comprised of switch Q2, Zener Diode D1 and resistor R7. The switch Q2 is controlled by the switch driver circuitry 1304. The peak output current of switch Q2 is clamped to a preselected value based upon the selected values of the Zener voltage of diode D1. Pulsed output from the switch Q2 is connected to the voltage regulator 1306 which through the feedback of R8 to the voltage sampling 1303 and the switch driver 1304 holds capacitor C1 to a constant charge. Control element switch Q1 and therefore supply switch Q2 are activated, either opened or closed, in synch with the AC input 1301. The AC to DC converter provides a low voltage output with pulse modulation at the frequency of the incoming AC source. The switches are activated, either opened or closed, at voltages that are near, within the threshold values for the components Q1 and Q2, of the zero crossing of the AC source. The Output then goes to voltage regulator 1307 and then load 1308. The voltage regulator 1307 includes switch Q3, Zener diode D3 resistor R9 and capacitor C2. Circuit components D3, Q3, R9 function as a voltage regulator equivalently to that already described for circuit elements 105, 104, 106 respectively in FIG. 1. Capacitor C2 provides storage capacity to buffer and thereby smooth the output from the AC to DC converter to the load 1308.

The AC to DC converter in the preferred embodiment of FIGS. 12 and 13 is comprised of elements of inrush protection 1202, voltage sampling 1203, a switch driver 1204, a switch and clamp 1205, a storage element 1206 and a voltage regulator 1207. Selection of components in the voltage sampling 1203 determine the timing of the switch driver 1204. Selection of elements in the switch and clamp determine a peak voltage and current for out pulses. Power output is controlled by selection of both the peak current and the pulse timing. Feedback from the storage element through the voltage sampling is used to select the pulse timing. The AC to DC converter operates in sync with the AC source.

The preferred embodiment of FIGS. 12 and 13 include in general a voltage divider 1203 connected to the power source 1201, and, a first switch 1204 connected through its input to the voltage divider, and, a second switch 1205 whose input is connected to the output of the first switch, and, a storage capacitor C1 connected through a diode to the output of the second switch, and, a sense resistor connected 1209 between the storage capacitor and the voltage divider thereby providing feedback control of the AC direct to DC extraction conversion system, and, a Zener diode D1 connected between the input and output of the second switch thereby clamping the voltage of the output and input of the second switch to the Zener voltage of the Zener diode, and, the electronic load 1208 connected to the storage capacitor C1. The switches 1204, 1205 may be any electronically actuated switch. In one embodiment the switches are N-MOSFETs. In another embodiment the switches are bipolar transistors and in another embodiment the switches are microelectromechanical switches.

Bidirectional Switch

Figure 14:
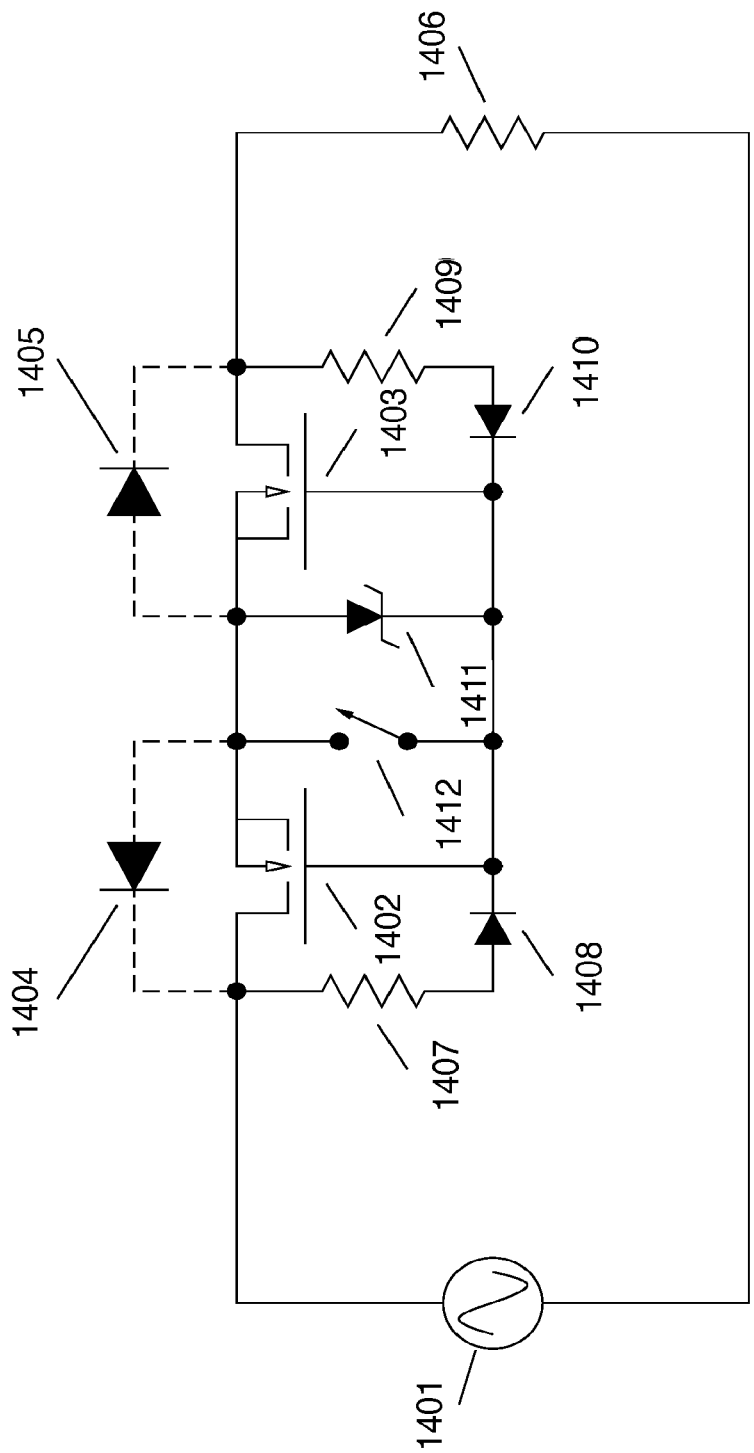
FIGS. 14-20 show details of the preferred embodiment of the bidirectional switch.

FIG. 14 is a schematic diagram showing the basic power MOSFET bidirectional switch controlling the power delivered from AC source 1401 to load 1406. Power MOSFETs 1402 and 1403 include body diodes 1404 and 1405, respectively. Zener diode 1411 exhibits a Zener voltage greater than the threshold voltage, $V_T$, of the power MOSFETs 1402 and 1403. Zener diode 1411 is biased through rectifier diodes 1408 and 1410 connected at the drain terminals of the power MOSFETs and protected by current limiting resistors 1407 and 1409, respectively. Thus, when switch 1412 is open, resistor-diode branches 1407-1408 and 1409-1410 provide bias for Zener diode 1411 when either of the drain terminals exceeds the Zener voltage, thereby placing power MOSFETs 1402 and 1403 in the "on" state. When closed, switch 1412 shunts the bias current from branches 1407-1408 and 1409-1410 to the source terminals of the power MOSFETS placing them in the "off" state. In this circuit the turn-on time constant is dictated by the value of the current limiting resistors 1407 and 1409 and the gate-to-source capacitance of the power MOSFETs, while the turn-off time constant is dictated by the MOSFET capacitances and the on-resistance of switch 1412. Both of these time constants can be designed to be much shorter than the period of the AC mains, thereby allowing this embodiment to operate in both an on-off and a phase-control mode.

Figure 15:
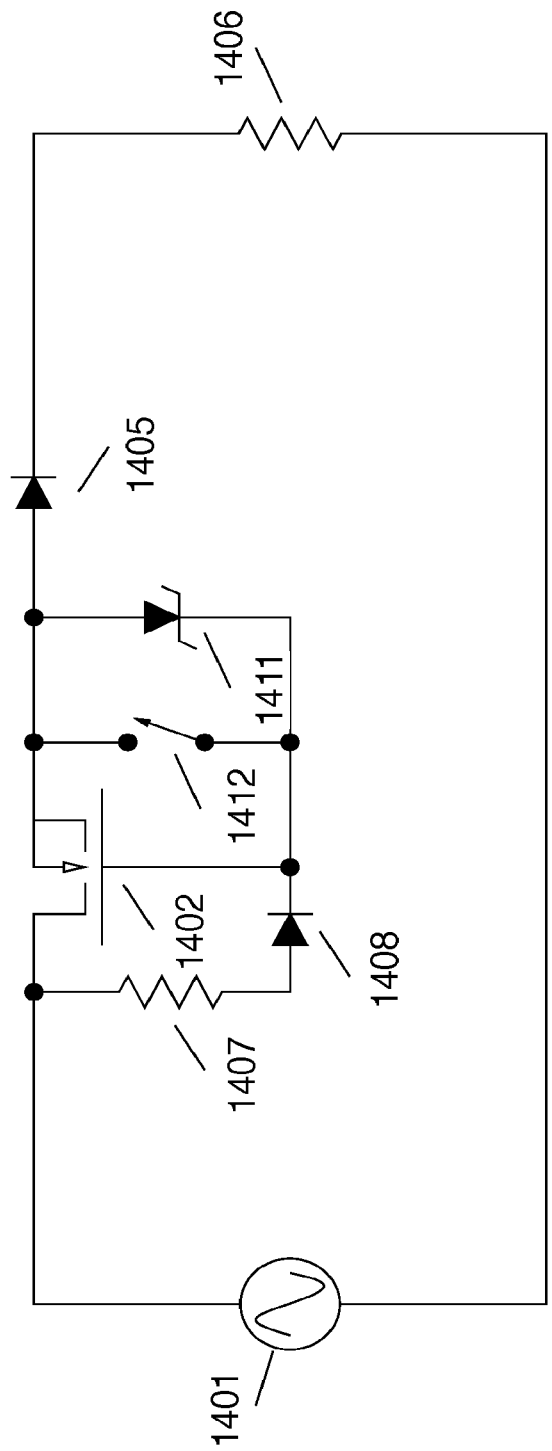

In practice, however, the Zener diode 1411 never reaches its Zener voltage, and the gate-source voltage of MOSFETs 1402 and 1403 rarely exceeds the threshold voltage, $V_T$. Thus, neither MOSFET 1402 or 1403 is fully "on" resulting in excess power dissipation in the units and reduced current supplied to the load 1406. FIG. 15 shows the active components of FIG. 14 when the voltage source 1401 is in the positive half-cycle of the ac mains waveform. When switch 1412 opens to allow MOSFET 1402 to enter its "on" state, the gate voltage of MOSFET 1402 begins to follow the positive excursion of source 1401 while the source voltage is at zero volts. When the gate voltage reaches the threshold voltage of MOSFET 1402, current begins to flow to load 1406 and body diode 1405 from MOSFET 1403 is forward biased. The source voltage of MOSFET 1402 then "follows" the rise in the gate voltage, lagging it by the value of the threshold voltage plus an additional bias to account for the current supplied to the load. This condition is maintained until the waveform of source 1401 becomes negative. Consequently, the drain-to-source voltage of MOSFET 1402 never falls below its threshold voltage, regardless of the drain-to-source resistance of the device, and the power dissipated in the switch is $I_D*V_T$. If the gate voltage can be boosted well beyond the threshold voltage, the the dissipated power is given by $I_D^2*r_{ds}$, where $r_{ds}$ is the "on" resistance of the switch. This value can be much smaller than $I_D*V_T$.

Figure 16:
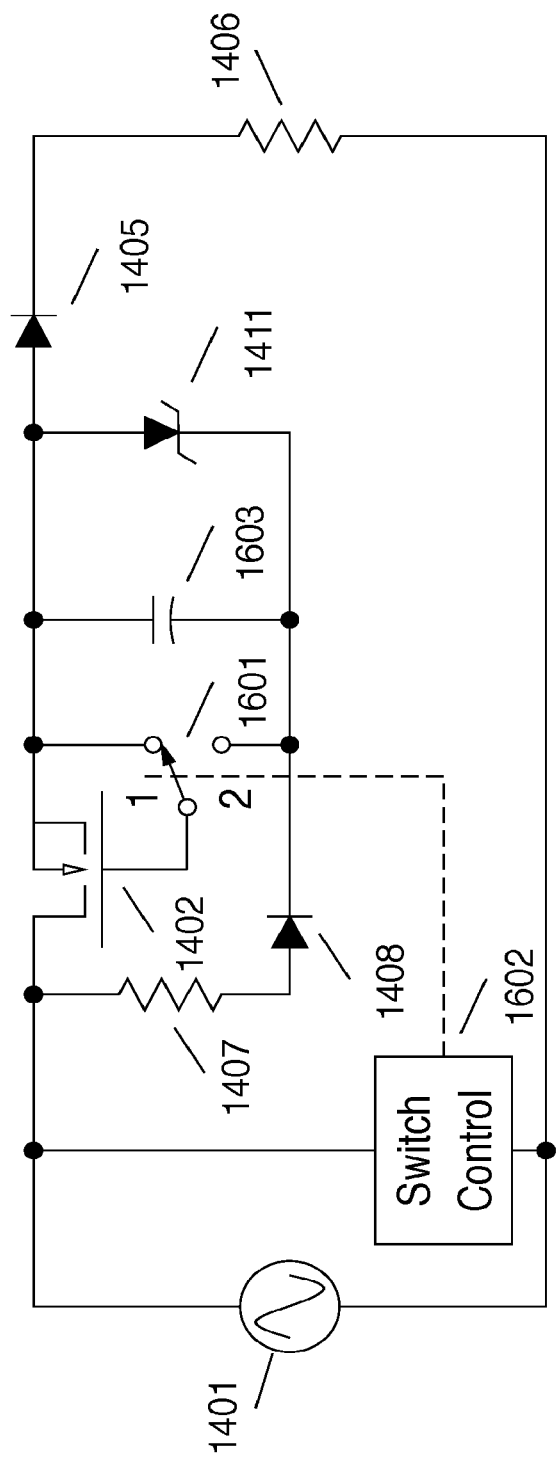

FIG. 16 shows a schematic of the half switch shown in FIG. 15 that allows a boost of the gate voltage. It differs from the circuit of FIG. 15 in the replacement of switch 1412 with a 2-pole switch 1601 which allows the gate of MOSFET 1402 to be connected either to its source or to the bias circuit 1407-1408. The bias circuit also includes capacitor 1603 connected in parallel with Zener diode 1411. Switch 1601 is controlled by Switch Control circuit 1602 that maintains the switch 1601 in either position 1, corresponding to MOSFET 1402 set in its "off" condition, or in position 2, which connects the gate to the bias circuit. Switch Control circuit 1602 is designed to keep switch 1601 in position 1 until the AC source 1401 waveform exceeds a pre-established trigger level, $V_{trig}$, whereupon it switches 1601 to position 2. Thus, switch 1601 and Switch Control circuit 1602 keep MOSFET 1402 in its "off" state until the AC voltage waveform reaches the trigger level, $V_{trig}$, which allows the bias circuit to charge to $V_{trig}$ while the source of MOSFET 1402 remains at 0 volts. When switch 1601 changes state, the bias voltage, $V_{trig}$, is applied to the gate which value can be much larger than the threshold voltage, $V_T$. The source of MOSFET 1402 begins charging towards $V_{trig}$-$V_T$, and part of this voltage step is coupled to the gate through capacitor 1603. This increases the gate bias well beyond $V_{trig}$ so that it exceeds the AC source 1401 voltage value. Thus, MOSFET 1402 reaches a state where the drain-to-source voltage is nearly zero, while the gate-to-source voltage is larger than $V_{trig}$. In this state MOSFET 1402 exhibits its minimum channel resistance, $r_{ds}$, and maximum voltage appears across load 1406.

Figure 17:
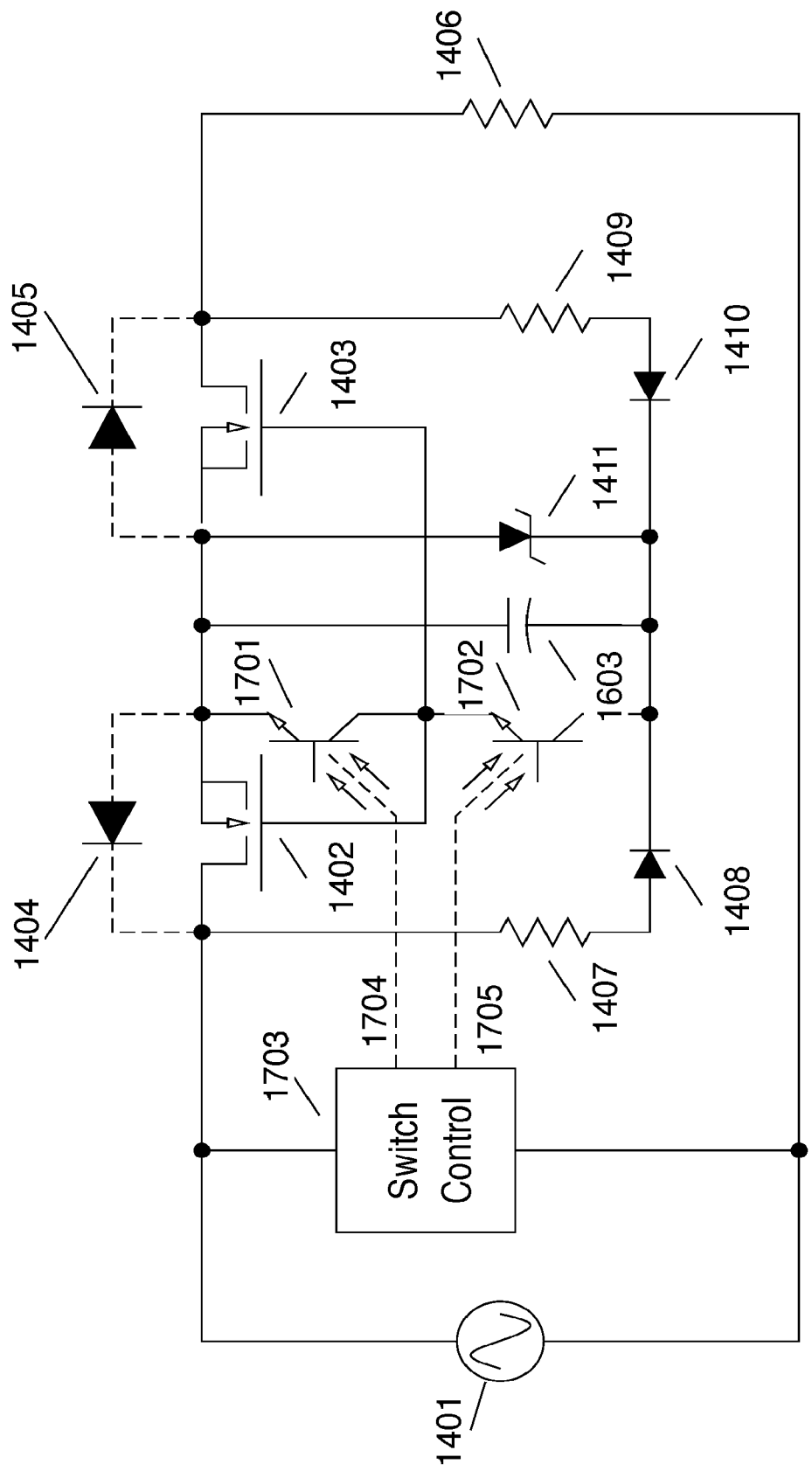

FIG. 17 illustrates an embodiment of the circuit of FIG. 16 in a fully bidirectional switch configuration. Switch 1601 is replaced with a pair of electronic control switches 1701 and 1702 that are controlled by an expanded Switch Control circuit 1703 having outputs 1704 and 1705 that drive 1701 and 1702, respectively. In the preferred embodiment, the switches 1701, 1702 are optical transistors. As in FIG. 16, the Switch Control circuit is characterized by a trigger level, Vtrig, that provides optical excitation via output 1704 if the absolute value of the AC mains source voltage level is less than Vtrig, and via output 1705 otherwise. The switch control is programmed such that the optical drive signals 1704, 1705 do not overlap, thereby providing a "break before make" switch characteristic and avoids discharging capacitor 1603 prematurely.

Figure 18:
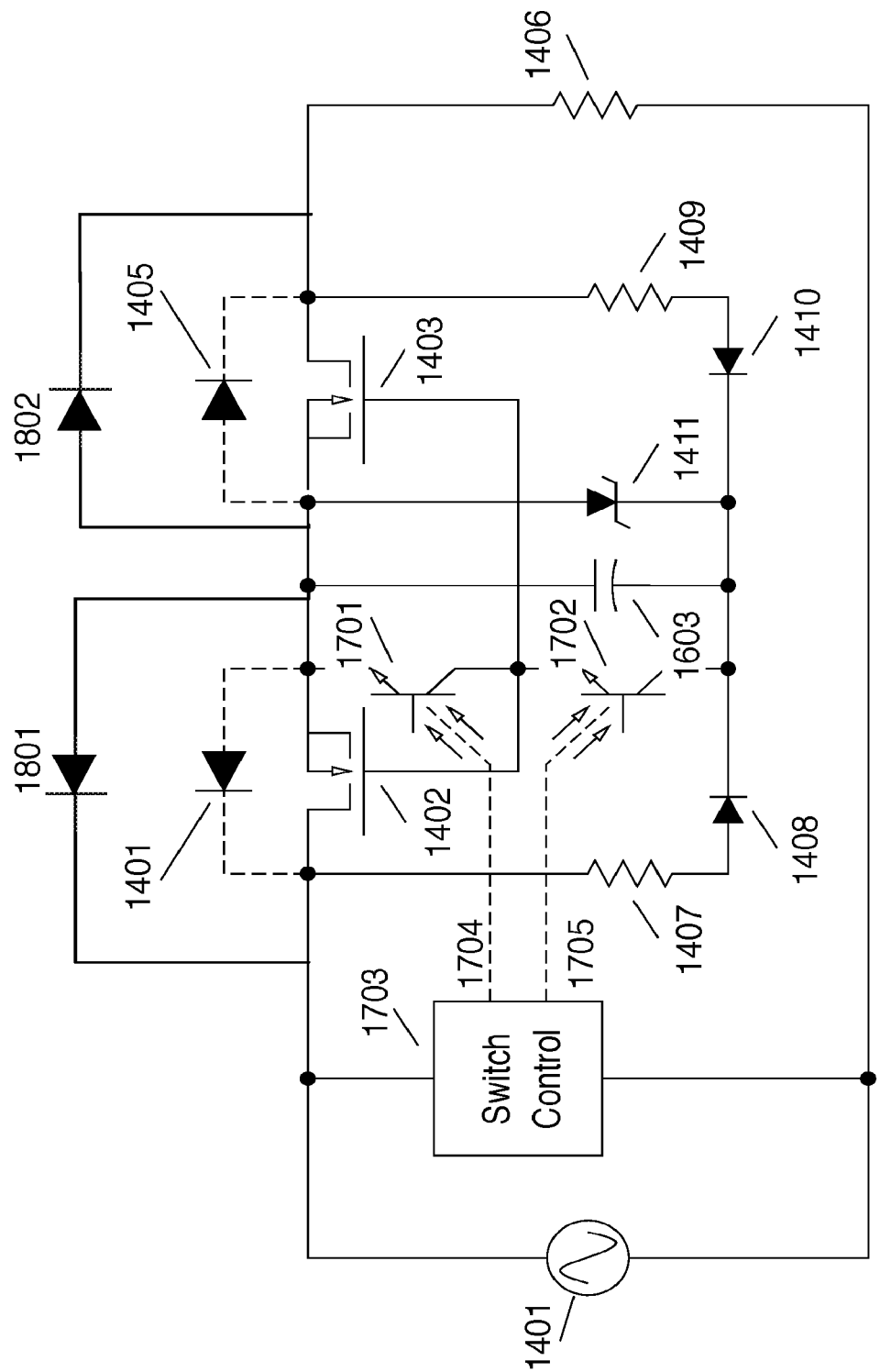

In another embodiment shown in FIG. 18, the bidirectional switch of FIG. 17 further includes bypass diodes 1801, 1802 which can bypass the intrinsic diodes 1404, 1405 of the MOSFETs 1402, 1403. All other components are consistently numbered and as discussed in previous FIGS. 14-17.

Figure 19:
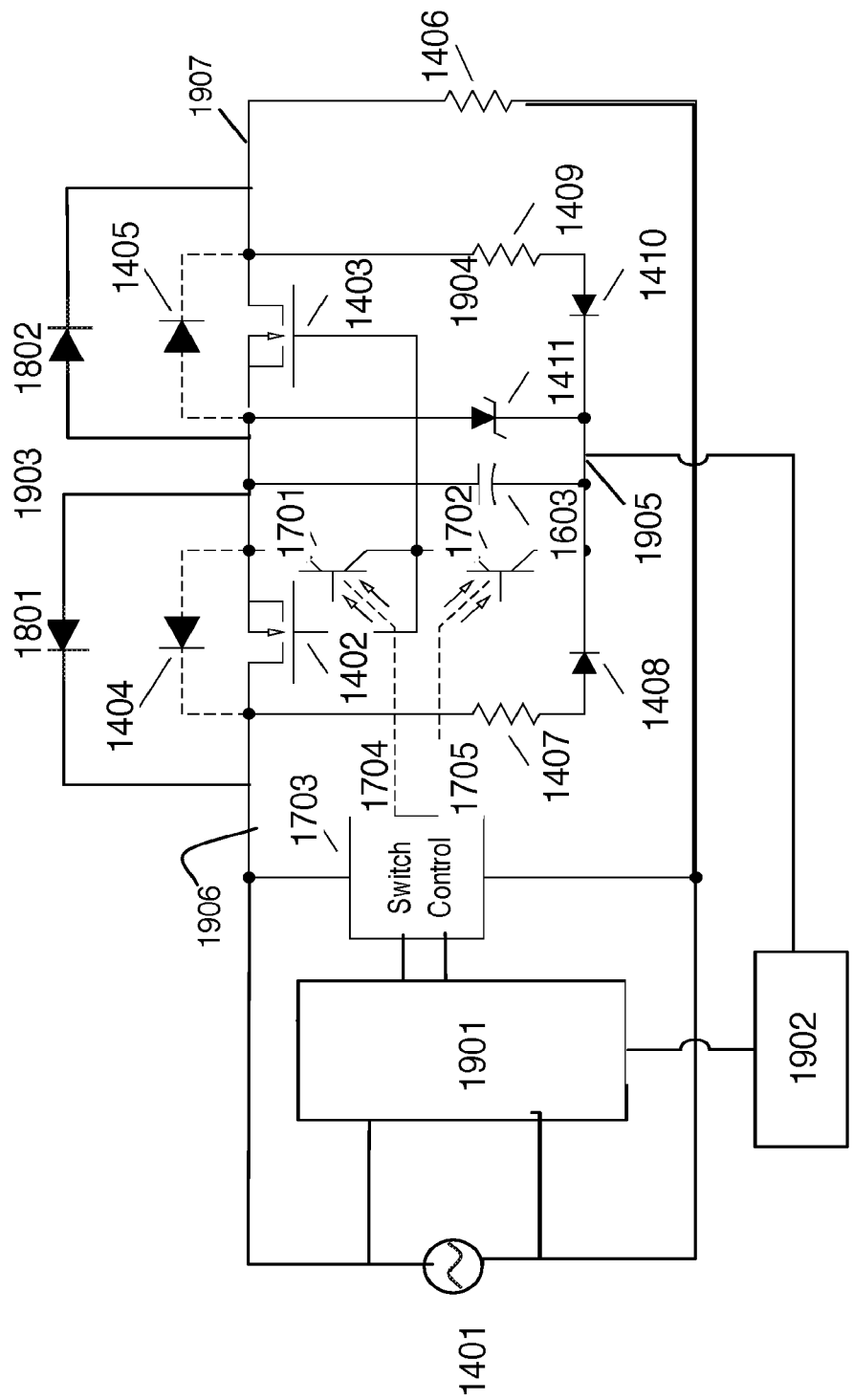

In another embodiment shown in FIG. 19 power to the switch control 1703 is provided by a low voltage AC to DC converter 1901. The AC to DC converter is in turn controlled by a current sensor 1902 such that the AC to DC converter and therefore the Switch control are turned off if no current is sensed in the bi-directional switch comprised of MOSFETs 1402, 1403. All other components are consistently numbered and as discussed in previous FIGS. 14-18. To summarize, the solid state bidirectional switch comprises: first and second series connected electronic switch devices 1402, 1403, each switch device having a drain terminal, a source terminal and a gate terminal and being characterized by a threshold voltage specified between the gate terminal and the source terminal, wherein the drain terminal of the first switch device comprises the input terminal 1906 of the solid state bidirectional switch and drain terminal of the second switch devices comprise the output terminal 1907 of the solid state bidirectional switch, the source terminals of the first and second switch devices are interconnected at a first control terminal 1903 and the gate terminals of the first and second switch devices are interconnected at a second control terminal 1904, and, a first control switch 1701 connected between the first control terminal and the second control terminal, and a bias terminal 1905 connected to the second control terminal through a second control switch 1702, and a voltage regulator device 1411 connected between the bias terminal and the first control terminal, and a capacitor 1603 connected in parallel with the voltage regulator device, and a first rectifier device 1408 connected from the input terminal of the switch circuit to the bias terminal through a first current limiting resistor 1407, and, a second rectifier device 1410 connected from the output terminal of the switch circuit to the bias terminal through a second current limiting resistor 1409, and, a switch control circuit 1703 that controls the first control switch and the second control switch, such that first control switch is closed when the second control switch is open and vice versa.

Figure 20:
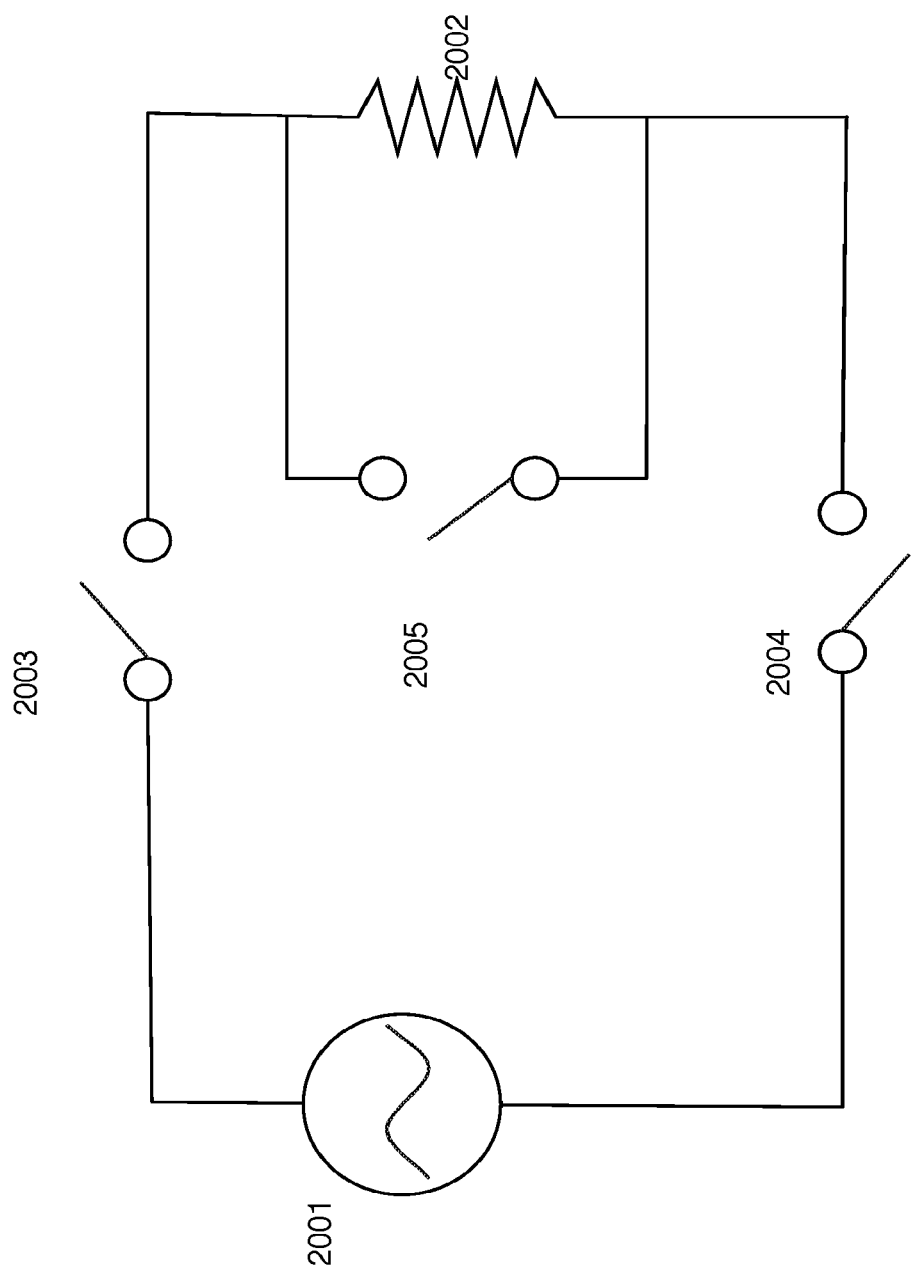

In another embodiment shown in FIG. 20, bidirectional switches 2003-2005, as described above are located between the source 2001 and the load 2002 and included in the line 2003 and the neutral 2004 as well as a bidirectional switch 2005 that bypasses the load 2002. Switch 2005 is closed when switch 2003 is open.

Load Identifying Sensor

Figure 21:
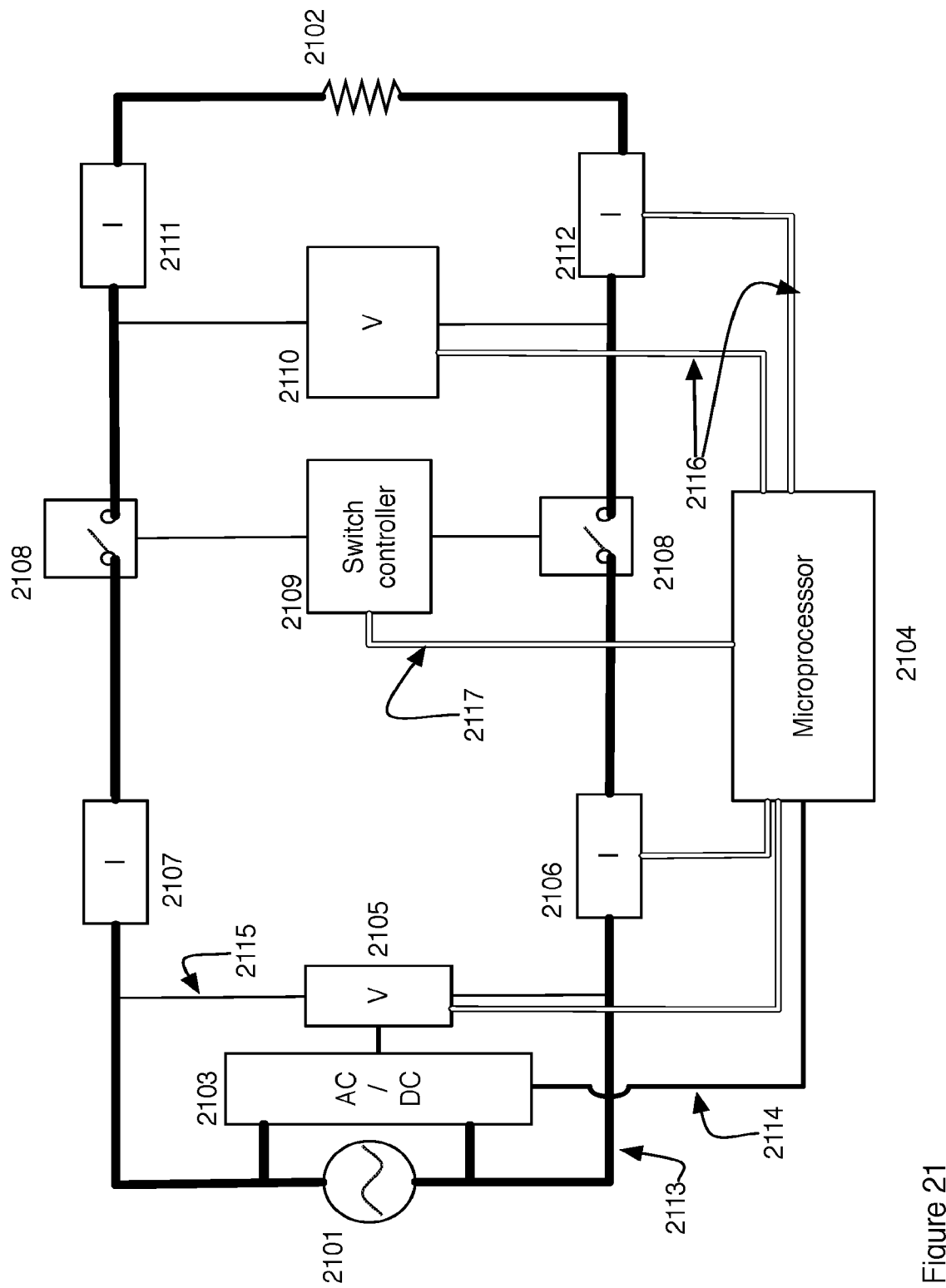
FIG. 21 shows details of the preferred embodiment of the load identifying sensor.
Figure 22:
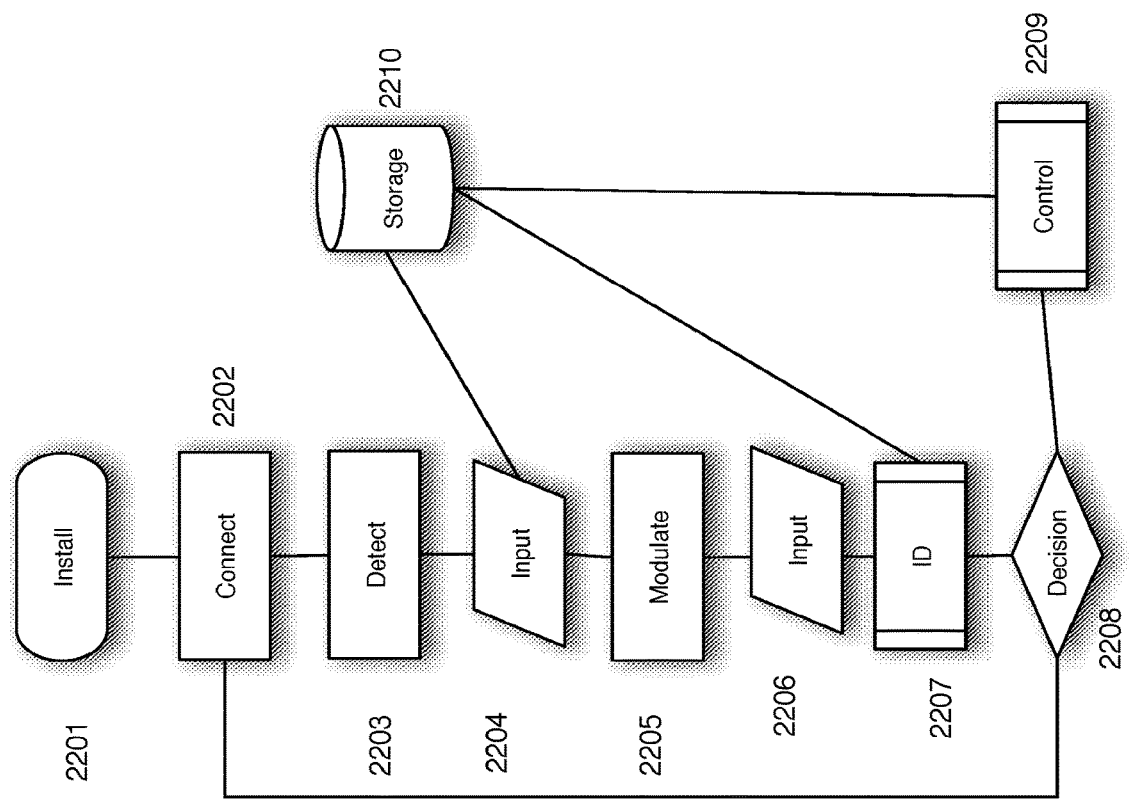
FIG. 22 shows a flow chart for operation of the load identifying sensor.

In one embodiment the sensor array includes sensors to identify the type of load and to control the load on the basis of the identification. FIG. 21 shows components of the circuitry to identify the type of load connected to the electrical box, be it an electrical outlet or a circuit connected to a switch. FIG. 22 shows a method to use the circuitry of FIG. 21.

The components in various embodiments of the load identifying AC power supply are seen in FIGS. 21. Referring first to FIG. 21, The AC mains 2101 is connected to the load 2102 through the load identifying AC power supply 2103-2116. The connecting lines in the Figure are shown as bold lines 2113 representing power connections lighter lines 2114 representing sense line connections and double lines 2116 representing data acquisition 2116 and control line 2117 connections. A switch 2108 is located in both the line and neutral arms between the source 2101 and the load 2102. In the preferred embodiment the switch is a bidirectional switch as described in FIGS. 14-19. The load identifying AC power supply includes an AC to DC converter 2103 that supplies power to the current sensors 2106, 2107, 2111, 2112 and voltage sensors 2105, 2110 that acquire the AC mains data and the load data. The AC/DC converter also supplies power to a microprocessor 2104. Details of the AC/DC converter in a preferred embodiment are shown and discussed in conjunction with FIGS. 12 and 13 above. The voltage and current sensors are as those known in the art and include voltage sensors using resistive dividers and current sensors including current-sensing resistor, and current amplifier, and Hall Effect sensors. The sampling results are typically processed by comparators, analog to digital converters (ADC) and stored in data storage elements that include random access memory, read only memory and other solid state memory and non-solid state memory devices as are known in the art. The Microprocessor includes components known in the art and associated with microprocessors including user interfaces to allow actuation and programming of the microprocessor, memory for storage of data and input and output ports for receiving data and sending control signals respectively. In one embodiment the input/output ports include means to access other computing devices such as handheld computing devices and remote servers. The microprocessor is programmed to effectuate the steps described in FIG. 22 below. Aspects of the microprocessor may be located remote from some components of the load identifying AC power supply. As a non-limiting example data storage of a library of data may be stored remotely and accessed by wired or wireless means such as through an Internet connection. Similarly, some computation, such as a neural network analysis of the load data may be accomplished on a remote server and the results sent to the microprocessor 2104. The switch 2108 and switch controller 2109 are controlled by the microprocessor. The details of the switch and switch controller in preferred embodiments are shown and discussed in FIGS. 14-19.

In one embodiment the AC/DC converter may be of any type known in the art that would supply a voltage and power suitable for a microprocessor, sensors and switch control. Such an AC/DC converter would include rectifier and transformer components to provide a selected voltage and power as required by sensor and microprocessor circuitry. Similarly, the switch 2108 and controller 2109 can be any switch/controller known in the art that can be programmably operated at frequencies required for phase angle modulation as already described. Non-limiting examples include triacs known to be used for phase angle modulation as well as solid state switches such as MOSFETs and other solid state switch devices as well as microelectromechanical (MEM) devices. In the preferred embodiment the components of the load identifying AC power supply are selected such that the entire device of FIG. 21 (Except the AC mains 2101 and the load 2102) can be integrated on silicon. In a preferred embodiment the AC to DC converter 2103 is as described in FIGS. 12 and 13 and the Switch 2108 and controller 2109 are as described in FIGS. 14-19 below and the entire load identifying AC power supply 2103-2116 is integrated onto silicon.

The wave forms of the AC mains and the voltage and current across and through the load are recorded and analyzed at a sampling frequency that is significantly greater than the cycle time of a single period of the AC mains. The sampling frequency of the voltage and current wave forms are selected as required to distinguish load types. In one embodiment the sampling frequency is at a kilohertz range. In another embodiment the sampling frequency is at a megahertz range. In a preferred embodiment, the programmed variation of the power applied to the load is selected so as to optimize differentiation in the acquired waveforms between anticipated load types. In one embodiment analysis of the waveforms includes matching patterns in the high frequency components of the voltage and current waveforms from the load. In another embodiment analysis of the wave forms includes determining a delay in timing of the load drawing power after power is first applied to the load. In another embodiment analysis means classifying the acquired waveforms, including high frequency components thereof, into groups that are indicative of different load types. Non-limiting examples of groups include waveforms indicative of a primarily resistive load, a capacitive load, an inductive load, loads that includes power factor correction and loads that include power control such that there is a delay in the power to the load at initial application of power form the source.

Referring now to FIG. 22, a method for using the load control AC source is shown. A load control appliance is installed 2201. In one embodiment installation includes electrically connecting the load control device between the AC mains supply and the load. In one embodiment this installation includes installing the load control device in the junction box. In another embodiment the installation includes installing the load control AC source in a wall outlet. In another embodiment installation includes installing the load control device as an electronic supply strip or smart extension cord by plugging the load control device into a conventional wall outlet and the load is to be plugged into the load control device. One the load control device is installed 2201, a load is attached to the load control device 2202. The load control device detects the load 2203 and power is supplied to the load by activating the switch within the load control device. The switch and the details of the the load control device are shown in subsequent Figures. Once load is detected, data acquisition 2204 is initiated. Data acquisition includes recording timing as to when the load is connected to power, when power is applied to the load and when power is used by the load. Data acquisition further includes acquiring waveform data. Any data acquired once a load is detected that is specific to a load is termed "load data". Load data includes the turn on timing of the load as well as waveform data. Waveform data includes acquiring values of the AC main voltage, the load voltage the load current and the power consumed by the load as a function of time. All are acquired at a frequency optimized for detection of the type of load. In one embodiment data is acquired at a frequency that is a multiple higher than the frequency of the AC mains source. In one embodiment data for a 50 to 60 cycle AC source data is acquired at a kilohertz rate. In another embodiment that relies upon high frequency components of the voltage and current wave forms for identification of the load, data is acquired at a megahertz rate. Acquired load data is stored 2209 for analysis. In one embodiment storage includes storage in short term random access memory of a microprocessor for immediate or nearly immediate processing. In another embodiment storage includes storage in long term memory such that the stored load data is used for subsequent pattern matching to identify the identical or similar loads based upon matching of the waveform patterns obtained at first connection of a load 2202 (i.e. first pass through the indicated flow chart) with connection of the same or different loads at later times. In one embodiment the storage 2209 includes storage that is accessible by a plurality of load control devices. Such storage is accessible by devices that are wired or wirelessly connected to the load control AC source or by transfer of the stored load data from a first load control AC source to a second load control AC source. Once connected 2202 and detected 2203 and after initial data acquisition 2204, the power to the device is modulated 2205. Modulation means varying the power to the device using a programmable switch. Further load data is acquired 2206 both during and after modulation and the load is then identified 2207 on the basis of the load data. In one embodiment identification is on the basis of comparing the wave forms of the load data with previous acquired waveforms in load data of known load devices. In another embodiment the load is identified on the basis of both the timing around the turn on of the power to the load, as already discussed, and matching of the wave form data. In another embodiment a neural network analysis is used to classify the load data into a category of load types by comparison with a library of prior load data. In another embodiment identification of the load means classifying the load into a particular category of load based upon the phase relationship between the load voltage and current wave forms and the AC mains voltage wave form both before, during and after modulation of the power to the load using the series switch. In one embodiment the load is identified 2207 as one of:

1. Pure Resistive Load. Voltage and current zero crossing and peak synchronously both before during and after modulation of the supply voltage. Power is reduced when voltage is reduced, power returns to pre-modulation level when modulation of supply voltage is stopped and supply voltage returns to full voltage.
2. Constant power Resistive load with power correction. Voltage and current peak synchronously before modulation, Power is constant before, during and after modulation,
3. Pure Reactive (capacitive or inductive) load. Voltage and current are out of phase before, during and after modulation, Power is reduced during modulation of the supply voltage, Power returns to pre-modulation level when modulation of supply voltage ends and returns to full voltage.
4. Constant Power Reactive load. Voltage and current are out of phase before, during and after modulation, Power is constant before, during and after modulation of the supply voltage.

In one embodiment the modulation of the supply voltage results in a reduction of the RMS supply voltage by an amount an amount between 1 and 20%.

In one embodiment identification 2207 further includes determining a confidence level for the identification. In one embodiment the confidence level is determined by the goodness of fit of a match of the load data obtained during the data acquisition steps 2204, 2206 with data obtained previously on known loads and stored 2210. Once the identification step 2207 is complete the system further checks 2208 whether the load has been identified and whether there are control rules associated with the load identification. In one embodiment the check 2208 on identification is done by comparing a confidence level in the identification with a pre-selected confidence level defined as positive identification. If the load is positively identified and there are pre-selected control rules associated with the identified load, then control 2209 of the load is implemented. In the preferred embodiment the power to the load is then controlled by the switch in series with the load. Non-limiting examples of pre-selected control rules include:

1. During daylight hours, a pure resistive load such as a light bulb is dimmed to reduce power usage, especially during peak demand.
2. In constant power load when load demands dropped the input power will drop accordingly to minimize the power consumption of no load/minimum load requirements.
3. In remote location (no human presence) the a pure resistive load and a constant power resistive load will be disconnected and reconnected automatically by the demand of the load
4. Devices that produce an arc during normal operation (e.g. an electric motor having brush connections to the rotor) are ignored by an arc fault circuit interrupter to prevent nuisance disconnects.

In another embodiment there are a pre-selected set of rules based upon whether the load is one selected from: a pure resistive, a constant power resistive, a pure reactive and a constant power reactive. In one non-limiting example of pre-selected rules loads identified as having an included power factor correction, that is constant power loads, are not turned off by the controller and a pure resistive loads are turned off during pre-selected periods of time and power to pure reactive loads is reduced during pre-selected periods of time.

Fault Detection Sensor

In another embodiment the sensor array includes fault detection sensors. The sensors detect both ground fault and arc fault failures in the load circuitry and control power to the load on the basis of fault detection.

Figure 23:
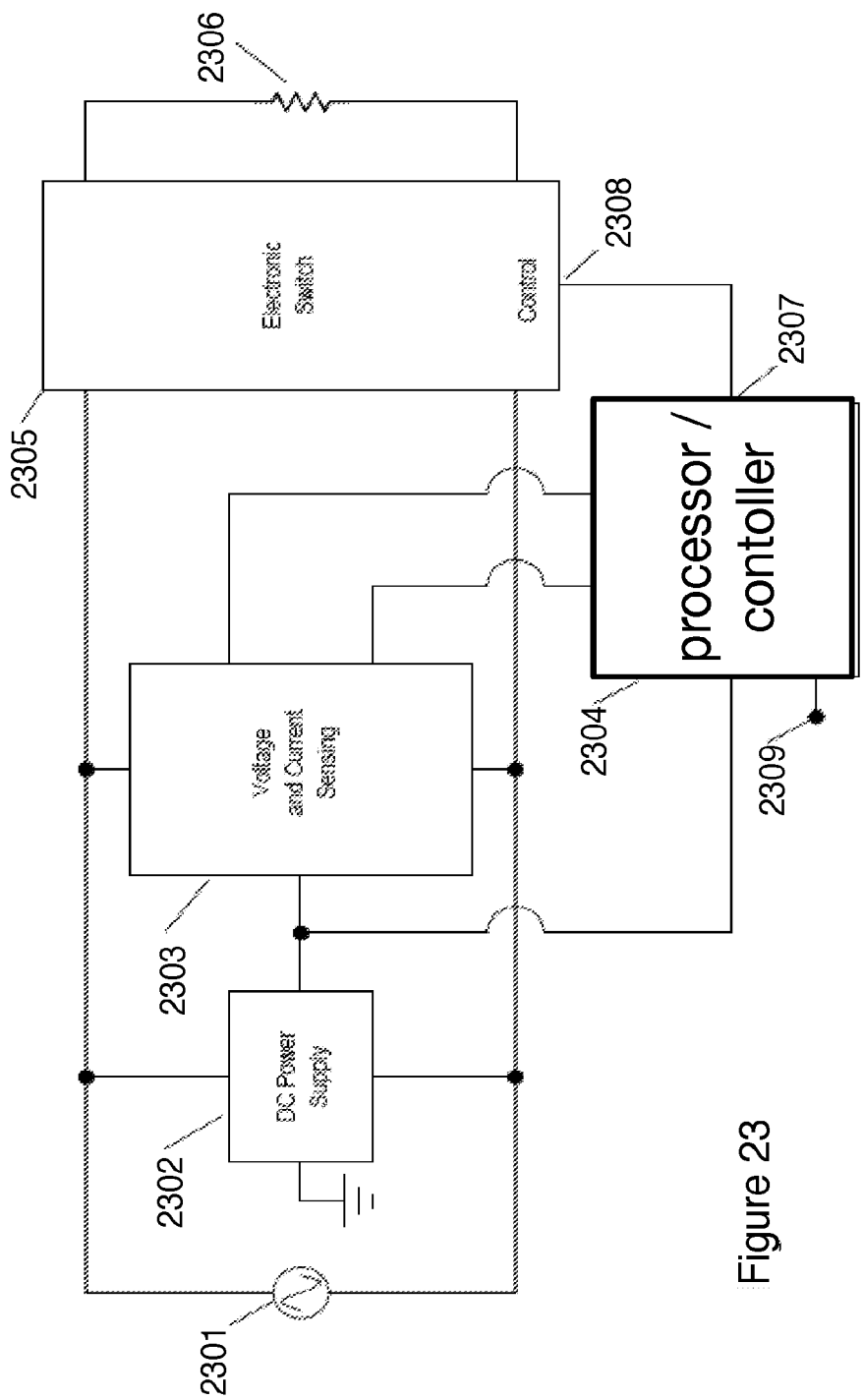
FIG. 23 shows a block diagram for an electrical fault detector.

FIG. 23 is a block diagram showing the key elements of the solid-state circuit interrupter. AC mains 2301 is connected to load 2306 through electronic switch unit 2305. A low voltage DC power supply 2302 efficiently provides power for mains voltage and current sensing circuit 2303 and the fault detection processor 2304. Sense inputs to the fault detection processor 2304 are provided from the voltage and current sensing circuit 2303. The solid-state sensing circuit comprising sensors that sense the waveforms of the voltage and current applied to the load circuit, and, develop proportional analog waveforms. The fault detection processor processes the proportional analog waveforms and upon detection of either a ground fault or an arc fault generates a fault output 2307. Upon detection of a fault, the Fault output 2307 of the fault detection processor 2304 is latched and fed to the control input 2308 of electronic switch 2305 which disconnects the load 2306 from the mains 2301 until a reset 2309 is applied to the fault detection processor 2304. In another embodiment the output voltage of the Electronic Switch 2305 can be varied through the control circuit 2308. In this embodiment upon detection of an arc fault, the output voltage can be reduced to a value that is less than a threshold for arcing yet greater than zero. Such an embodiment allows the load circuit to continue operation at a reduced voltage while reducing the chance for a damaging arc. The operation at reduced voltage also allows for continued characterization of the load and mains supply circuit to determine the location of an arc fault for subsequent replacement or repair.

Figure 24:
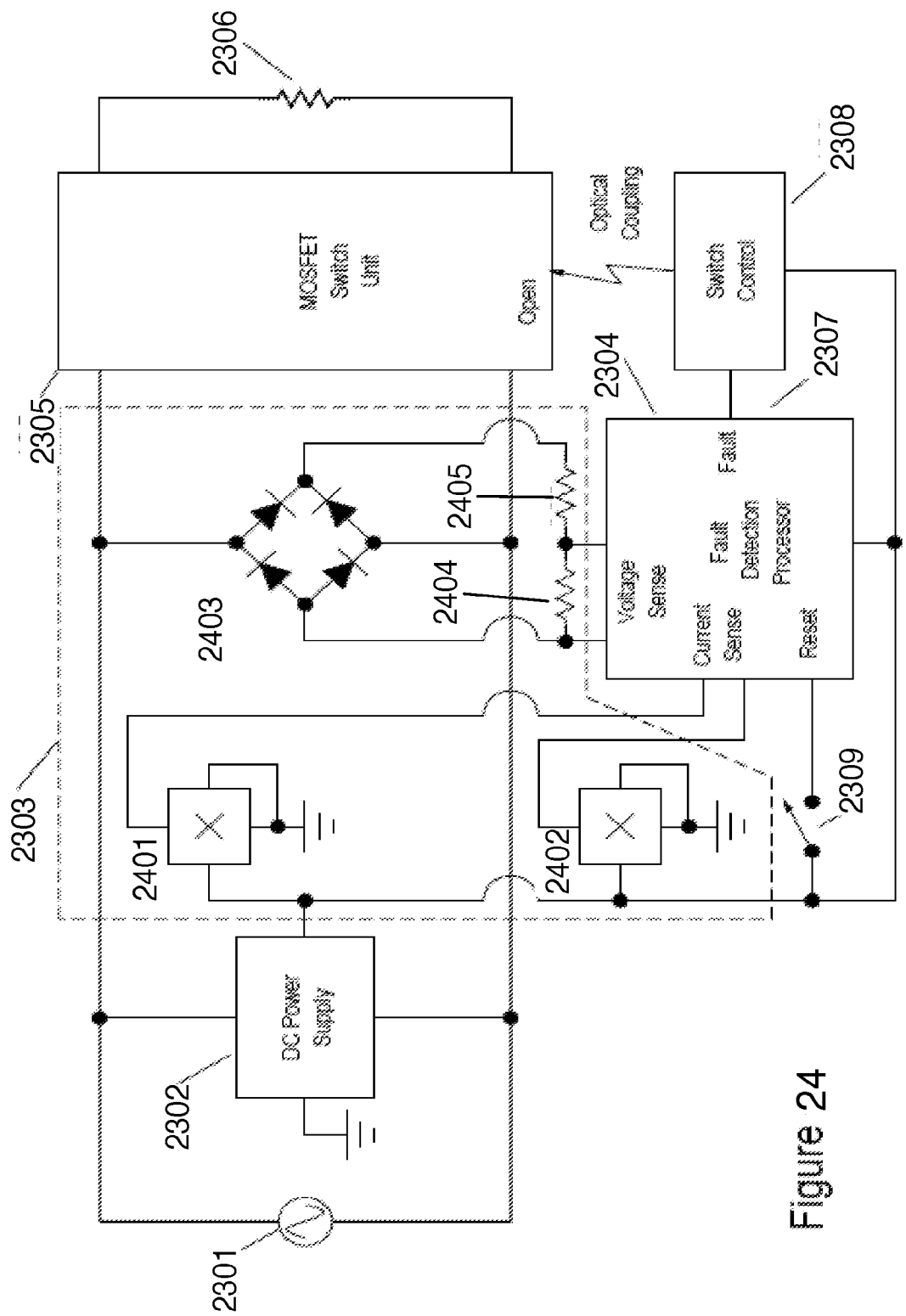
FIG. 24 shows component details for the electrical fault detector.
Figure 25:
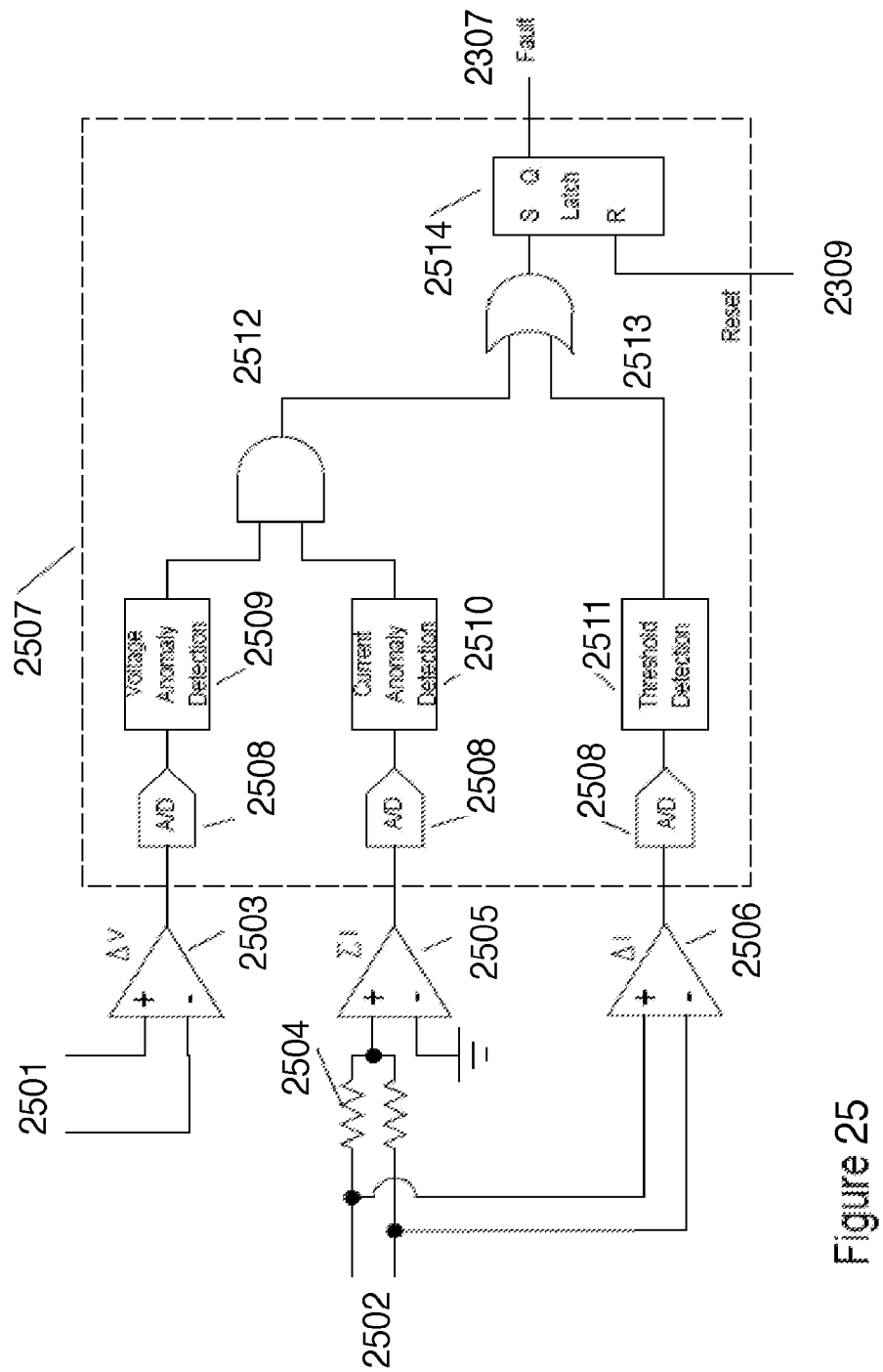
FIG. 25 shows details of the processor for the electrical fault detector.

FIG. 24 is a schematic diagram of an embodiment of the solid-state circuit interrupter. AC mains 2301 is connected to load 2306 through bidirectional MOSFET switch unit 2305. Low voltage AC to DC power supply 2302 provides power for mains voltage and current sensing circuit 2303, the fault detection processor 2304 and the bidirectional MOSFET switch control circuit 2308. Sense inputs to the fault detection processor 2304 are provided from the voltage and current sensing circuit 2303. Current sensing is provided using solid-state Hall Effect sensors 2401 and 2402 which provide an output voltage proportional to the current flowing through the sensor. The Hall Effect sensor outputs are fed to the current sense inputs of the fault detection processor 104. The AC mains voltage waveform is full-wave rectified in bridge unit 2403. (In order to reduce the number of components in the circuit, bridge 2403 can be eliminated and the full-wave rectified waveform obtained directly from the output of the AC-DC converter circuit. Bridge 2403 is illustrated here for clarity.) The full-wave rectified waveform is attenuated using a resistive divider network comprising resistors 2404 and 2405 and applied to the voltage sense inputs of the fault detection processor 2304. Upon detection of a fault, the Fault output 2307 of the fault detection processor 2304 is latched and fed to the control input of electronic switch control circuit 2308 which provides the optical control signal to the bidirectional MOSFET switch unit 2305 which disconnects the load 2306 from the mains 2301 until a reset 2309 is applied to the fault detection processor 2304. In another embodiment the output voltage of the Electronic Switch is varied through the control circuit 2308. In this embodiment upon detection of an arc fault, the output voltage is reduced to a value that is less than a threshold for arcing yet greater than zero. Such an embodiment allows the load circuit to continue operation at a reduced voltage while reducing the chance for a damaging arc. The operation at reduced voltage also allows for continued characterization of the load and mains supply circuit to determine the location of an arc fault for subsequent replacement or repair. FIG. 25 is a schematic diagram showing an embodiment of the Fault Detection Processor. The voltage sense signals are applied to the input terminals of a differential amplifier and the resulting difference signal $\Delta V$ is applied to the input of an analog-to-digital (A/D) converter 2508 within microprocessor 2507. Similarly, the current sense inputs are summed in the input circuit 2504 of operational amplifier 2505 forming a signal proportional to the sum of the currents $\Sigma I$ in the line and neutral legs of the AC mains. The signal $\Sigma I$ is also applied to the input of an A/D converter.

The digitized $\Delta V$ signal is processed by subprogram 2509 within the microprocessor to detect anomalies in the voltage waveform over several cycles that indicate the presence of an arc fault. One nonlimiting example of such a voltage anomaly is the presence of excess high frequency energy impressed upon the normally low frequency AC mains voltage waveform. The digitized $\Sigma I$ signal is processed by subprogram 2510 within microprocessor 2507 to detect anomalies in the current waveforms over several cycles that indicate the presence of an arc fault. One nonlimiting example of such a current anomaly is the occurrence of "shoulders" (flat spots) in the current waveform that occur near zero-crossings of the current waveform. The combined appearance of a voltage waveform anomaly and a current waveform anomaly is one indicator of an arc fault 2512. The current sense signals are also applied to the inputs of operational amplifier 2506 which forms a difference signal $\Delta I$ proportional to the difference between the currents in the line and neutral legs. The $\Delta I$ signal is digitized and is processed by subprogram 2511 which accomplishes a threshold detection that signals a ground fault 2513. Arc fault 2512 and ground fault 2513 signals are combined and applied to the input of latch 2514 which stores the fault condition 2307 until cleared by an external reset signal.

SUMMARY

A building automation system that is comprised of a plurality of network connected electrical modules contained in standard receptacle gang boxes for outlets and switches is described. The system includes an AC to DC power supply, a bidirectional solid state dimmer switch, a microprocessor, and, interconnected sensors that are powered and controlled by microprocessors within the electrical modules. The electrical modules include a user interface for programming and control. The system provides enhanced safety and security, power metering, power control, and home diagnostics. The apparatus replaces existing outlet receptacles and switches with a familiar flush but elegantly updated and seamlessly integrated faceplate.

We claim:

1. A building automation system comprising:
    a) a plurality of electrical modules that supply electrical power from an AC source with an applied AC voltage and applied AC current to an AC load, each of the electrical modules comprising:
        i) an AC to DC converter that supplies power to a DC load, and,
        ii) a first solid state bidirectional switch having an input terminal connected to the AC source and an output terminal connected to the AC load, and,
        iii) a second solid state bidirectional switch having an input terminal connected to the AC load and an output terminal connected to the AC source, and,
        iv) a microprocessor, having a wireless communication port, a user interface, and, programmed to control both the first solid state bidirectional switch and the second solid state bidirectional switch, and,
        v) a sensor selected from at least one of a load identifying sensor and an electrical fault detection sensor, and,
    b) wherein the AC to DC converter comprises:
        i) a voltage divider connected to the AC power source, and,
        ii) a first semiconductor switch, having an input and an output, connected through its input to the voltage divider, and,
        iii) a second semiconductor switch, having an input and an output, whose input is connected to the output of the first switch, and,
        iv) a storage capacitor connected through a diode to the output of the second switch, and,
        v) a sense resistor connected between the storage capacitor and the voltage divider thereby providing feedback control, and,
        vi) a Zener diode connected between the input and output of the second semiconductor switch thereby clamping the voltage of the output and input of the second semiconductor switch to the Zener voltage of the Zener diode, and,
        vii) the DC load connected to the storage capacitor.

2. The building automation system of claim 1 further comprising electronic circuitry interposed between the first semiconductor electronic switch and the storage capacitor to limit the current flowing through the first semiconductor switch.

3. The building automation system of claim 1 further including sense lines from the DC load passing through an isolator to the voltage divider thereby providing feedback control from the DC load to the AC to DC converter.

4. The building automation system of claim 1 wherein the first semiconductor switch and the second semiconductor switch are both MOS field effect transistors.

5. The building automation system of claim 1 further comprising a third solid state bidirectional switch that bypasses the load.

6. The building automation system of claim 5 wherein the third solid state bidirectional switch is open when the first solid state bidirectional switch is closed and the third solid state bidirectional switch is closed when the first solid state bidirectional switch is open.

7. A building automation system comprising:
    a) a plurality of electrical modules that supply electrical power from an AC source with an applied AC voltage and applied AC current to an AC load, each of the electrical modules comprising:
        i) an AC to DC converter that supplies power to a DC load, and,
        ii) a first solid state bidirectional switch having an input terminal connected to the AC source and an output terminal connected to the AC load, and,
        iii) a second solid state bidirectional switch having an input terminal connected to the AC load and an output terminal connected to the AC source, and,
        iv) a microprocessor, having a wireless communication port, a user interface, and, programmed to control the first solid state bidirectional switch and the second solid state bidirectional switch, and,
        v) a sensor selected from at least one of a load identifying sensor and an electrical fault detection sensor, and,
    b) wherein the first solid state bidirectional switch and the second solid state bidirectional each comprises:
        i) first and second series connected switch devices, each switch device having a drain terminal, a source terminal and a gate terminal and being characterized by a threshold voltage specified between the gate terminal and the source terminal, wherein the drain terminal of the first switch device comprises the input terminal of the solid state bidirectional switch and drain terminal of the second switch devices comprise the output terminal of the solid state bidirectional switch, the source terminals of the first and second switch devices are interconnected at a first control terminal and the gate terminals of the first and second switch devices are interconnected at a second control terminal, and;
        ii) a voltage source having a voltage that exceeds the first and second switch device threshold voltages and applied across the first and second switch device control terminals through a current limiting resistor, wherein the voltage source comprises:
            (1) a first rectifier device connected from the input terminal of the switch circuit to the second switch device control terminal, and,
            (2) a second rectifier device connected from the output terminal of the switch circuit to the second switch device control terminal, and,
            (3) a voltage regulator device connected from the first switch device control terminal to the second switch device control terminal, and,
        iii) a switch connected across the first and second switch device control terminals.

8. The building automation system of claim 7 wherein the solid state bidirectional switch further comprises:
  a) a photo-activated electronic device characterized by a conductance proportional to the intensity of illumination incident upon the photo-activated electronic device and connected from the first switch device control terminal to the second switch device control terminal, and,
  b) a light emitting device connected to a first and a second bidirectional electronic switch control terminals, and, arranged to illuminate the photo-activated electronic device wherein the intensity of the light emitted by the light emitting device is proportional to an amplitude of an external control signal applied to the first and second bidirectional electronic switch control terminals.

9. The building automation system of claim 7 wherein the first and second switch devices are MOSFETs.

10. The building automation system of claim 7 further comprising a third solid state bidirectional switch, the third solid state bidirectional switch bypasses the load, the third bidirectional switch comprised identically to the first and second solid state bidirectional switches except that the second rectifier device of the third solid state bidirectional switch is connected to the output of the third solid state bidirectional switch and the switch control circuit controls the first solid state bidirectional switch, the second solid state bidirectional switch and the third solid state bidirectional switch.

11. The building automation system of claim 10 wherein the third solid state bidirectional switch is open when the first solid state bidirectional switch is closed and the third solid state bidirectional switch is closed when the first solid state bidirectional switch is open.

12. A building automation system comprising:
  a) a plurality of electrical modules that supply electrical power from an AC source with an applied AC voltage and applied AC current to an AC load, each of the electrical modules comprising:
    i) an AC to DC converter that supplies power to a DC load, and,
    ii) a first solid state bidirectional switch having an input terminal connected to the AC source and an output terminal connected to the AC load, and,
    iii) a second solid state bidirectional switch having an input terminal connected to the AC load and an output terminal connected to the AC source, and,
    iv) a microprocessor, having a wireless communication port, a user interface, and, programmed to control the first solid state bidirectional switch and the second solid state bidirectional switch, and,
    v) a sensor selected from at least one of a load identifying sensor and an electrical fault detection sensor, and,
  b) wherein the first solid state bidirectional switch and the second solid state bidirectional switch each comprises:
    i) first and second series connected switch devices, each switch device having a drain terminal, a source terminal and a gate terminal and being characterized by a threshold voltage specified between the gate terminal and the source terminal, wherein the drain terminal of the first switch device comprises the input terminal of the solid state bidirectional switch and drain terminal of the second switch device comprise the output terminal of the solid state bidirectional switch, the source terminals of the first and second switch devices are interconnected at a first control terminal and the gate terminals of the first and second switch devices are interconnected at a second control terminal, and,
    ii) a first control switch connected between the first control terminal and the second control terminal, and
    iii) a bias terminal connected to the second control terminal through a second control switch, and
    iv) a voltage regulator device connected between the bias terminal and the first control terminal, and
    v) a capacitor connected in parallel with the voltage regulator device, and
    vi) a first rectifier device connected from the input terminal of the switch circuit to the bias terminal through a first current limiting resistor, and
    vii) a second rectifier device connected from the output terminal of the switch circuit to the bias terminal through a second current limiting resistor, and,
    viii) a switch control circuit that controls the first control switch and the second control switch, such that first control switch is closed when the second control switch is open and vice versa.

13. The building automation system of claim 12 wherein the first control switch and the second control switch are photo-transistors.

14. The building automation system of claim 12 wherein the first and second electronic switch devices are MOSFETs.

15. The building automation system of claim 12 further comprising a third solid state bidirectional switch that bypasses the load, the third solid state bidirectional switch comprised identically to the first and second solid state bidirectional switches and the switch control circuit controls the first solid state bidirectional switch, the second solid state bidirectional switch and the third solid state bidirectional switch.

16. The building automation system of claim 15 wherein the third bidirectional switch is open when the first bidirectional switch is closed and the third bidirectional switch is closed when the first bidirectional switch is open.

17. A building automation system comprising:
  a) a plurality of electrical modules that supply electrical power from an AC source with an applied AC voltage and applied AC current to an AC load, each of the electrical modules comprising:
    i) an AC to DC converter that supplies power to a DC load, and,
    ii) a first solid state bidirectional switch having an input terminal connected to the AC source and an output terminal connected to the AC load, and,
    iii) a second solid state bidirectional switch having an input terminal connected to the AC load and an output terminal connected to the AC source, and,
    iv) a microprocessor, having a wireless communication port, a user interface, and, programmed to control the solid state bidirectional switch, and,
    v) a sensor selected from at least one of a load identifying sensor and an electrical fault detection sensor, and,
  b) wherein the electrical fault detection sensor comprises:
    i) a fault detection circuit and a solid state sensing circuit,
    ii) the solid-state sensing circuit comprising sensors that sense the waveforms of the applied AC voltage and applied AC current to the AC load, and, develop proportional analog waveforms of the applied AC voltage and the applied AC current, and,
    iii) a fault processing circuit comprising:
      (1) a solid-state processor that processes the proportional analog waveforms, and upon at least one of:

1) detecting the presence of a ground fault in the AC load circuit and 2) detecting the presence of an arc fault in the AC load circuit, generates a fault output signal, and, iv) a reset port that stops the fault output signal upon receiving a reset signal.

18. The building automation system of claim 17 further comprising a third solid state bidirectional switch that bypasses the load, the third solid state bidirectional switch comprised identically to the first and second solid state bidirectional switches and the switch control circuit controls the first solid state bidirectional switch, the second solid state bidirectional switch and the third solid state bidirectional switch.

19. The building automation system of claim 18 wherein the third bidirectional switch is open when the first bidirectional switch is closed and the third bidirectional switch is closed when the first bidirectional switch is open.

20. A building automation system comprising:

a) a plurality of electrical modules that supply electrical power from an AC source with an applied AC voltage and applied AC current to an AC load, each of the electrical modules comprising:

i) an AC to DC converter that supplies power to a DC load, and, ii) a first solid state bidirectional switch having an input terminal connected to the AC source and an output terminal connected to the AC load, and, iii) a second solid state bidirectional switch having an input terminal connected to the AC load and an output terminal connected to the AC source, and, iv) a microprocessor, having a wireless communication port, a user interface, and, programmed to control the solid state bidirectional switch, and, v) a sensor selected from at least one of a load identifying sensor and an electrical fault detection sensor, and, b) wherein the load identifying sensor comprises:

i) a first voltage sensor to monitor the AC voltage, and, ii) a second voltage sensor to monitor an AC voltage applied through the bidirectional switch to the AC load, and, iii) a current sensor to monitor the AC current drawn by the AC load, and, iv) the microprocessor programmed to accept input from the first voltage sensor, the second voltage sensor and the current sensor and to control the bidirectional switch, such that, a first set of waveforms of the first voltage sensor, the second voltage sensor and the current sensor are acquired during a first period of time after a connection of the AC load to the AC power supply, and, a second set of waveforms of the first voltage sensor, the second voltage sensor and the current sensor are acquired during a second period of time after a connection of the AC load to the AC power supply, each of the first set of waveforms and the second set of waveforms having an amplitude and a phase shift relative to one another, and, v) the AC voltage to the load during the second period of time is reduced using phase angle modulation of the AC voltage to the AC load by the bidirectional switch, and, vi) the microprocessor is further programmed to identify the load by comparing the first set of waveforms with the second set of waveforms.

21. The building automation system of claim 20 further comprising a third solid state bidirectional switch that bypasses the load, the third solid state bidirectional switch comprised identically to the first and second solid state bidirectional switches and the switch control circuit controls the first solid state bidirectional switch, the second solid state bidirectional switch and the third solid state bidirectional switch.

22. The building automation system of claim 21 wherein the third bidirectional switch is open when the first bidirectional switch is closed and the third bidirectional switch is closed when the first bidirectional switch is open.

* * * * *